US010254587B2

(12) United States Patent
Kim et al.

(10) Patent No.: US 10,254,587 B2
(45) Date of Patent: Apr. 9, 2019

(54) LIQUID CRYSTAL DISPLAY APPARATUS AND METHOD OF MANUFACTURING THE SAME

(71) Applicant: Samsung Display Co., Ltd., Yongin-si (KR)

(72) Inventors: Hyunjin Kim, Yongin-si (KR); Sujeong Kim, Yongin-si (KR); Yiseop Shim, Yongin-si (KR); Daewon Lee, Yongin-si (KR); Chul Huh, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/400,272

(22) Filed: Jan. 6, 2017

(65) Prior Publication Data

US 2017/0255060 A1    Sep. 7, 2017

(30) Foreign Application Priority Data

Mar. 7, 2016 (KR) ........................ 10-2016-0027155

(51) Int. Cl.
*G02F 1/1335* (2006.01)
*G02F 1/1337* (2006.01)
(Continued)

(52) U.S. Cl.
CPC ...... *G02F 1/133621* (2013.01); *G02F 1/1337* (2013.01); *G02F 1/13362* (2013.01);
(Continued)

(58) Field of Classification Search
None
See application file for complete search history.

(56) References Cited

U.S. PATENT DOCUMENTS 9,146,419 B1 *  9/2015  Anandan .............. G02B 6/0035
2013/0107170 A1  5/2013  Gee et al.
(Continued)

FOREIGN PATENT DOCUMENTS

KR   10-2013-0046495   5/2013
KR   10-2013-0059221   6/2013
(Continued)

OTHER PUBLICATIONS

Chen et al., "Color-Tunable Light-Emitting Device Based on the Mixture of CdSe Nanorods and Dots Embedded in Liquid-Crystal Cells," J. Phys. Chem. C, Apr. 1, 2010, pp. 7995-7998, vol. 114, No. 17, American Chemical Society.

*Primary Examiner* — Ryan Crockett
(74) *Attorney, Agent, or Firm* — H.C. Park & Associates, PLC

(57) ABSTRACT

A liquid crystal display apparatus includes a first substrate, a color filter substrate disposed over the first substrate, and a liquid crystal layer disposed between the first substrate and the color filter substrate. The first substrate and the color filter substrate include a first sub-pixel region, a second sub-pixel region, and a third sub-pixel region. The color filter substrate includes: a second substrate facing the first substrate; an electrode pattern disposed over a surface of the second substrate, the surface facing the first substrate; a first light-converter disposed in association with the first sub-pixel region, the first light-converter including a first quantum rod; a second light-converter disposed in association with the second sub-pixel region, the second light-converter including a second quantum rod; and a third light-converter disposed in association with the third sub-pixel region.

13 Claims, 21 Drawing Sheets

(51) Int. Cl.
*G02F 1/1343* (2006.01)
*G02F 1/1333* (2006.01)

(52) U.S. Cl.
CPC .... *G02F 1/13439* (2013.01); *G02F 1/133512* (2013.01); *G02F 1/133514* (2013.01); *G02F 1/133516* (2013.01); *G02F 1/133528* (2013.01); *G02F 1/133617* (2013.01); *G02F 1/133753* (2013.01); *G02F 1/134309* (2013.01); *G02F 2001/133357* (2013.01); *G02F 2001/133531* (2013.01); *G02F 2001/133614* (2013.01); *G02F 2001/133757* (2013.01); *G02F 2001/134345* (2013.01); *G02F 2201/121* (2013.01); *G02F 2202/36* (2013.01)

(56) References Cited

U.S. PATENT DOCUMENTS

| | | | |
|---|---|---|---|
| 2013/0135558 | A1 | 5/2013 | Kim et al. |
| 2013/0242228 | A1* | 9/2013 | Park ................. G02F 1/133617 349/61 |
| 2015/0009440 | A1* | 1/2015 | Lee .......................... G02F 2/02 349/42 |
| 2016/0216545 | A1 | 7/2016 | Lee et al. |
| 2016/0320664 | A1 | 11/2016 | Kang et al. |
| 2016/0370655 | A1* | 12/2016 | Nagayama ......... H01L 51/5281 |
| 2017/0256752 | A1* | 9/2017 | Gee .................... H01L 51/5281 |
| 2017/0336675 | A1* | 11/2017 | Kim ................. G02F 1/133536 |
| 2018/0031883 | A1* | 2/2018 | Li ........................ G02F 1/1368 |

FOREIGN PATENT DOCUMENTS

| | | |
|---|---|---|
| KR | 10-2013-0059222 | 6/2013 |
| KR | 10-2014-0022634 | 2/2014 |
| KR | 10-2014-0086058 | 7/2014 |
| KR | 10-2015-0004225 | 1/2015 |
| KR | 10-2015-0061918 | 6/2015 |
| KR | 10-2016-0093140 | 8/2016 |
| KR | 10-2016-0130055 | 11/2016 |

* cited by examiner

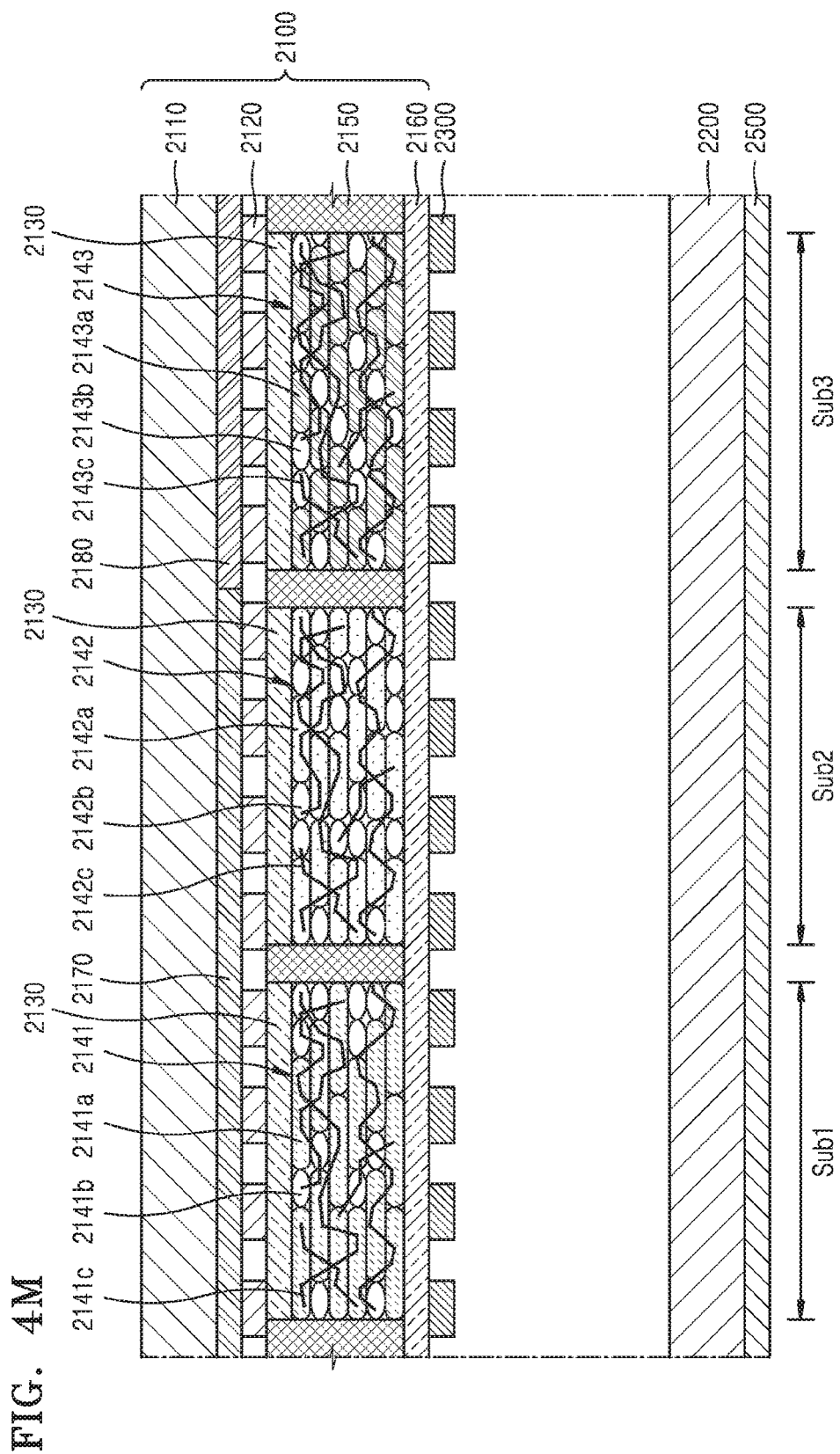

LIQUID CRYSTAL DISPLAY APPARATUS AND METHOD OF MANUFACTURING THE SAME

CROSS-REFERENCE TO RELATED APPLICATION

This application claims priority from and the benefit of Korean Patent Application No. 10-2016-0027155, filed on Mar. 7, 2016, which is hereby incorporated by reference for all purposes as if fully set forth herein.

BACKGROUND

Field

Exemplary embodiments relate to a liquid crystal display (LCD) apparatus and a method of manufacturing the same, and, more particularly, to an LCD apparatus including quantum rods and a method of manufacturing the LCD apparatus.

Discussion of the Background

With the development of various electronic devices, such as mobile phones, personal digital assistants (PDAs), computers, large-scale televisions (TVs), and the like, has come an increasing demand for flat panel displays that may be incorporated (or otherwise associated) with the electronic devices. An LCD apparatus among various other types of flat panel displays typically has relatively high quality characteristics, such as relatively low power consumption, relatively high contrast, etc., as well as being relatively easy to display images.

Conventional LCDs include a liquid crystal layer arranged between two display substrates. An electric field may be applied to the liquid crystal layer to change an alignment direction of liquid crystal molecules of the liquid crystal layer that, in turn, may be utilized to change the polarization of incident light. The alignment of the liquid crystal molecules may also determine whether incident light is blocked or passed through the liquid crystal layer to control pixels of the LCD to display an image.

The above information disclosed in this Background section is only for enhancement of understanding of the background of the inventive concept, and, therefore, it may contain information that does not form the prior art that is already known to a person of ordinary skill in the art.

SUMMARY

One or more exemplary embodiments provide a liquid crystal display (LCD) apparatus including quantum rods configured to function as a polarizer and a color filter.

One or more exemplary embodiments provide a method of manufacturing an LCD apparatus including quantum rods configured to function as a polarizer and a color filter. The method enabling manufacturing costs to be reduced and a color reproduction rate of the LCD apparatus to be improved.

Additional aspects will be set forth in the detailed description which follows, and, in part, will be apparent from the disclosure, or may be learned by practice of the inventive concept.

According to one or more embodiments, a liquid crystal display apparatus includes a first substrate, a color filter substrate disposed over the first substrate, and a liquid crystal layer disposed between the first substrate and the color filter substrate. The first substrate and the color filter substrate include a first sub-pixel region, a second sub-pixel region, and a third sub-pixel region. The color filter substrate includes: a second substrate facing the first substrate; an electrode pattern disposed over a surface of the second substrate, the surface facing the first substrate; a first light-converter disposed in association with the first sub-pixel region, the first light-converter including a first quantum rod; a second light-converter disposed in association with the second sub-pixel region, the second light-converter including a second quantum rod; and a third light-converter disposed in association with the third sub-pixel region.

According to one or more embodiments, a method of manufacturing a liquid crystal display apparatus includes: forming a color filter substrate; coupling a first substrate to the color filter substrate; and forming a liquid crystal layer between the first substrate and the color filter substrate. Forming the color filter substrate includes: forming an electrode pattern over a second substrate, the second substrate including a first sub-pixel region, a second sub-pixel region, and a third sub-pixel region; forming a first material in the first sub-pixel region, the first material including a first quantum rod and liquid crystal; forming a second material in the second sub-pixel region, the second material including a second quantum rod and the liquid crystal; forming a third material in the third sub-pixel region, the third material including the liquid crystal; and forming a first light-converter, a second light-converter, and a third light-converter by applying voltage to the electrode pattern to align the liquid crystal and long axes of the first quantum rod and the second quantum rod in a same direction.

According to one or more exemplary embodiments, a color filter substrate includes: a first sub-pixel region including a first material composition, the first material composition being configured to polarize incident light and to convert a first color of the incident light into a second color; a second sub-pixel region including a second material composition, the second material composition being configured to polarize incident light and to convert the first color of the incident light into a third color different from the second color; and a third sub-pixel region including a third material composition, the third material composition being configured to polarize incident light of the first color and to emit polarized light of the first color.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIGS. 4A, 4B, 4C, 4D, 4E, 4F, 4G, 4H, 4I, 4J, 4K, 4L, and 4M are respective cross-sectional views of the LCD apparatus of FIG. 3 at various stages of manufacture, according to one or more exemplary embodiments.

DETAILED DESCRIPTION OF THE ILLUSTRATED EMBODIMENTS

Figure 1:
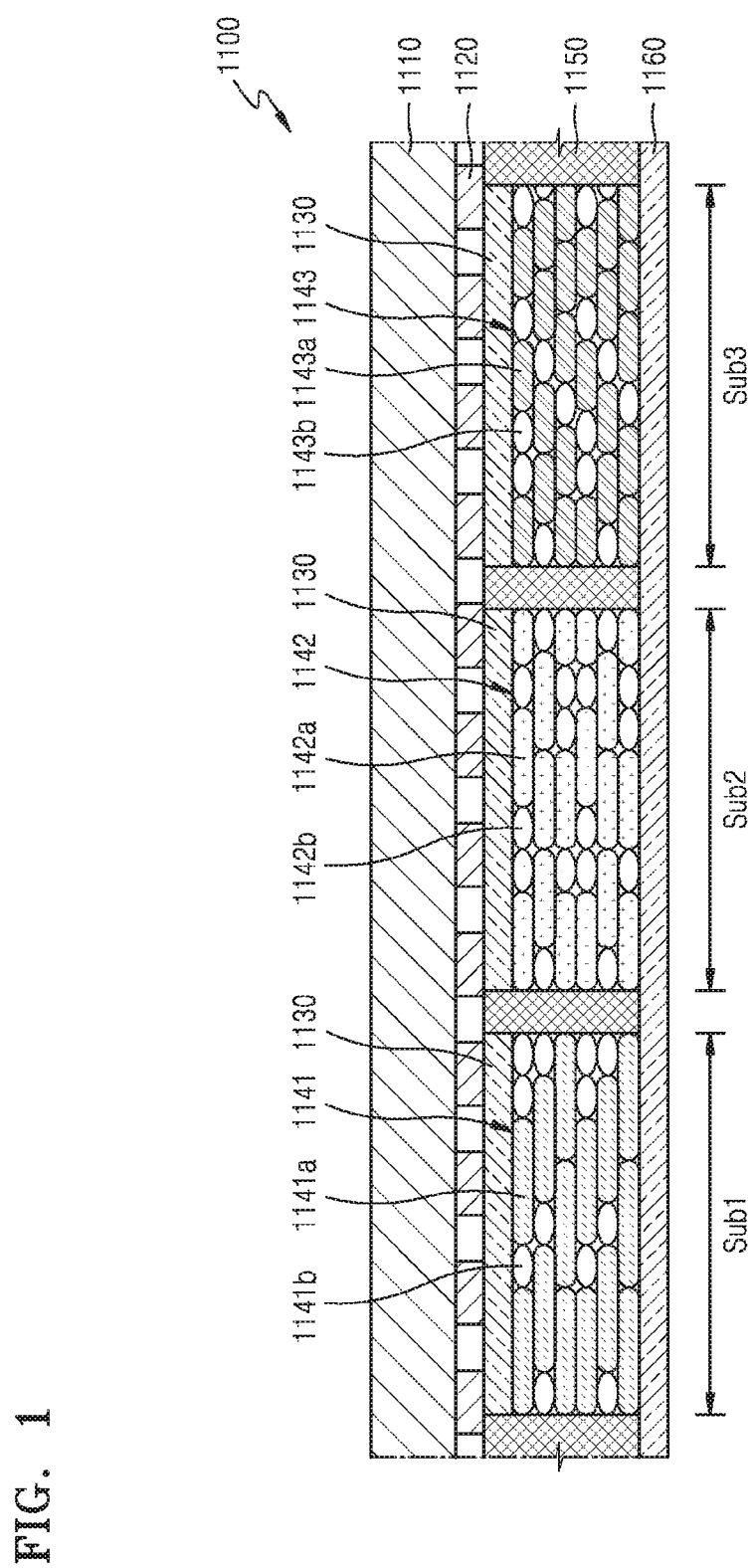
FIG. 1 is a cross-sectional view of a color filter substrate of a display apparatus, according to one or more exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

Unless otherwise specified, the illustrated exemplary embodiments are to be understood as providing exemplary features of varying detail of various exemplary embodiments. Therefore, unless otherwise specified, the features, components, modules, layers, films, panels, regions, and/or aspects of the various illustrations may be otherwise combined, separated, interchanged, and/or rearranged without departing from the disclosed exemplary embodiments. Further, in the accompanying figures, the size and relative sizes of layers, films, panels, regions, etc., may be exaggerated for clarity and descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a cross-sectional view of a color filter substrate of a display apparatus, according to one or more exemplary embodiments.

Referring to FIG. 1, a color filter substrate 1100 of a display apparatus includes a first (e.g., top) substrate 1110 including a first sub-pixel region Sub1, a second sub-pixel region Sub2, and a third sub-pixel region Sub3. An electrode pattern 1120 is disposed on the top substrate 1110, and a first light-converter 1141 including a first quantum rod 1141a, a second light-converter 1142 including a second quantum rod 1142a, and a third light-converter 1143 including an anisotropic material 1143a. The first light-converter 1141, the second light-converter 1142, and the third light-converter 1143 are arranged on the electrode pattern 1120 in correspondence with the first sub-pixel region Sub1, the second sub-pixel region Sub2, and the third sub-pixel region Sub3, respectively.

A display apparatus (e.g., a liquid crystal display (LCD)) apparatus) may include a plurality of pixels and may be configured to display an image using the pixels. Each of the pixels represents a minimum unit for displaying an image, and may include a plurality of sub-pixels. For example, the sub-pixels may emit light with different colors through the first sub-pixel region Sub1, the second sub-pixel region Sub2, and the third sub-pixel region Sub3 of the color filter substrate 1100. In this manner, each pixel may realize a determined color of light based on selective combinations of the colors of the included first sub-pixel region Sub1, the second sub-pixel region Sub2, and the third sub-pixel region Sub3.

Light incident on the color filter substrate 1100 may be converted to a determined color light by passing through the color filter substrate 1100. According to one or more exemplary embodiments, a pixel may include the first sub-pixel region Sub1, the second sub-pixel region Sub2, and the third sub-pixel region Sub3, and light passed through the first sub-pixel region Sub1, the second sub-pixel region Sub2, and the third sub-pixel region Sub3 may become a first color light, a second color light, and a third color light, respectively. Light may be selectively incident on the first sub-pixel region Sub1, the second sub-pixel region Sub2, and the third sub-pixel region Sub3 so that a determined color of light may be realized by selectively combining the first color light, the second color light, and the third color light. It is noted that the first color light, the second color light, and the third color light may be combined spatially and/or temporally to realize a larger color space.

The first light-converter 1141, the second light-converter 1142, and the third light-converter 1143 are arranged to correspond to the first sub-pixel region Sub1, the second sub-pixel region Sub2, and the third sub-pixel region Sub3, respectively. The first light-converter 1141 may include the first quantum rod 1141a, and the second light-converter 1142 may include the second quantum rod 1142a. Also, the third light-converter 1143 may include the anisotropic material 1143a.

The quantum rod may be a semiconductor nanoparticle, and as a quantum dot, the quantum rod may include a core consisting of groups II-VI, III-V, and IV-VI nanoscale semiconductors and a shell surrounding the core. Unlike the quantum dot that is a round-shape nanoparticle, the quantum rod may have a bar shape including a short axis and a long axis. The quantum rod may have a particular band gap according to a composition and a size of the core. In this manner, the quantum rod may absorb light of a determined wavelength and may emit light of a wavelength that corresponds to the band gap energy. To this end, the quantum rod may convert a wavelength of incident light and may emit light that is polarized along the long axis of the quantum rod. As such, when long axes of a plurality of quantum rods are aligned in a direction, a layer formed of the quantum rods may function as a polarizer.

The top substrate 1110 may be a substrate including any suitable material, such as glass, plastic, or the like. The electrode pattern 1120 and an alignment layer 1130 covering the electrode pattern 1120 may be arranged on the top substrate 1110. The electrode pattern 1120 may include patterned electrodes including a transparent material, such as indium tin oxide (ITO), or the like. An electric field may be formed via the electrode pattern 1120 by applying voltage to the electrode pattern 1120. The electric field may be utilized to align the direction(s) of the first quantum rod 1141a and the second quantum rod 1142a. The first quantum rod 1141a and the second quantum rod 1142a may be aligned in a determined direction according to an alignment direction of the electric field and the alignment layer 1130. When the electrode pattern 1120 is not patterned, even if voltage is applied to the electrode pattern 1120, the electric field may not be suitably formed. As such, the electrode pattern 1120 may be formed of patterned electrodes, e.g., a plurality of electrodes spaced apart from each other. According to one or more exemplary embodiments, the plurality of electrodes may be divided into two groups with electrodes in the same group being connected to one another. In this manner, if different voltages are applied to the electrodes in each group, the electric field may be formed between the groups.

The first light-converter 1141, the second light-converter 1142, and the third light-converter 1143 are arranged on the alignment layer 1130 in the first sub-pixel region Sub1, the second sub-pixel region Sub2, and the third sub-pixel region Sub3, respectively. The first light-converter 1141 may include the first quantum rod 1141a and liquid crystal 1141b, the second light-converter 1142 may include the second quantum rod 1142a and liquid crystal 1142b, and the third light-converter 1143 may include the anisotropic material 1143a and liquid crystal 1143b. The anisotropic material 1143a may be a material having different physical properties depending on a direction. For instance, when the anisotropic material 1143a included in the third light-converter 1143 is aligned in a determined direction, the anisotropic material 1143a may perform a polarizing function. Further, when the first quantum rod 1141a and the second quantum rod 1141a are aligned in a determined direction, the first quantum rod 1141a and the second quantum rod 1141a may also perform a polarizing function.

The liquid crystals 1141b, 1142b, and 1143b are dipole materials that may be aligned in a determined direction by an electric field. The liquid crystals 1141b, 1142b, and 1143b may be easily aligned even in the presence of low voltage. In this manner, when the liquid crystals 1141b, 1142b, and 1143b are aligned, the first quantum rod 1141a, the second quantum rod 1142a, and the anisotropic material 1143a may also be aligned in a same direction as the alignment direction of the liquid crystals 1141b, 1142b, and 1143b.

According to one or more exemplary embodiments, the anisotropic material 1143a may be an anisotropic dye that absorbs only a polarized component in a particular direction or may be a third quantum rod different from the first quantum rod 1141a and the second quantum rod 1142a. According to one or more exemplary embodiments, the anisotropic dye may be an iodine molecule. In association with the alignment of the first quantum rod 1141a, the second quantum rod 1142a, and the anisotropic material 1143a, the top substrate 1110 may perform, without a separate polarizer, a function of transmitting only light that is polarized along long axes of the first quantum rod 1141a, the second quantum rod 1142a, and the anisotropic material 1143a. That is, the first quantum rod 1141a, the second quantum rod 1142a, the anisotropic material 1143a, and the liquid crystals 1141b, 1142b, and 1143b included in the first sub-pixel region Sub1, the second sub-pixel region Sub2, and the third sub-pixel region Sub3 may be aligned in the same direction, and due to the alignment, the first light-converter 1141, the second light-converter 1142, and the third light-converter 1143 may function as a polarizer that transmits only polarized light in a particular direction.

Light with different colors may be emitted from the first sub-pixel region Sub1, the second sub-pixel region Sub2, and the third sub-pixel region Sub3. Also lengths of short axes and/or long axes of the first quantum rod 1141a and the second quantum rod 1142a may be different from each other. According to one or more exemplary embodiments, the length of the long axis of the first quantum rod 1141a may be longer than the length of the long axis of the second quantum rod 1142a, and a wavelength of light emitted from the first light-converter 1141 may be longer than a wavelength of light emitted from the second light-converter 1142.

According to one or more exemplary embodiments, the third light-converter 1143 includes the anisotropic material 1143a, and if the anisotropic material 1143a in an aligned state does not perform color-conversion, but transmits only particular polarized light, light incident on the third sub-pixel region Sub3 of the color filter substrate 1100 may propagate through the third sub-pixel region Sub3, such that a wavelength of the light is not changed by the third light-converter 1143. In addition, the anisotropic material 1143a may include the third quantum rod different from the first quantum rod 1141a and the second quantum rod 1142a. According to one or more exemplary embodiments, a length of a long axis of the third quantum rod may be shorter than the length of each of the long axes of the first quantum rod 1141a and the second quantum rod 1142a, and a wavelength of light emitted from the third quantum rod may be shorter than a wavelength of light emitted from each of the first light-converter 1141 and the second light-converter 1142. For example, as for the length of a long axis of the quantum rod, the first quantum rod may have the longest length of the long axes and the third quantum rod may have the shortest length of the long axes. In this manner, the wavelength of light emitted from the first light-converter 1141 may be longer than the wavelength of light emitted from the second light-converter 1142, and the wavelength of light emitted from the second light-converter 1142 may be longer than the wavelength of light emitted from the third light-converter 1143. As such, light with different colors may be emitted from the first sub-pixel region Sub1, the second sub-pixel region Sub2, and the third sub-pixel region Sub3.

A partition wall 1150 may be disposed between the first light-converter 1141 and the second light-converter 1142 and may be disposed between the second light-converter 1142 and the third light-converter 1143. The partition wall 1150 may be disposed on the electrode pattern 1120. The partition wall 1150 may be formed of a light-absorbing material, and may define the first sub-pixel region Sub1, the second sub-pixel region Sub2, and the third sub-pixel region Sub3. According to one or more exemplary embodiments, the partition wall 1150 and the alignment layer 1130 may be disposed in a same layer on the electrode pattern 1120, and the alignment layer 1130 may include alignment patterns that are separated from each other by the partition wall 1150 and are disposed in the first sub-pixel region Sub1, the second sub-pixel region Sub2, and the third sub-pixel region Sub3, respectively.

A planarization layer 1160 including a transparent insulating material may be disposed on the first light-converter 1141, the second light-converter 1142, and the third light-converter 1143, as well as on the partition wall 1150. In this manner, the planarization layer 1160 may encapsulate the first, second, and third light-converters 1141, 1142, and 1143. The planarization layer 1160 may include various organic materials appropriate for functioning as an overcoat layer or performing a planarization function.

Figure 2:
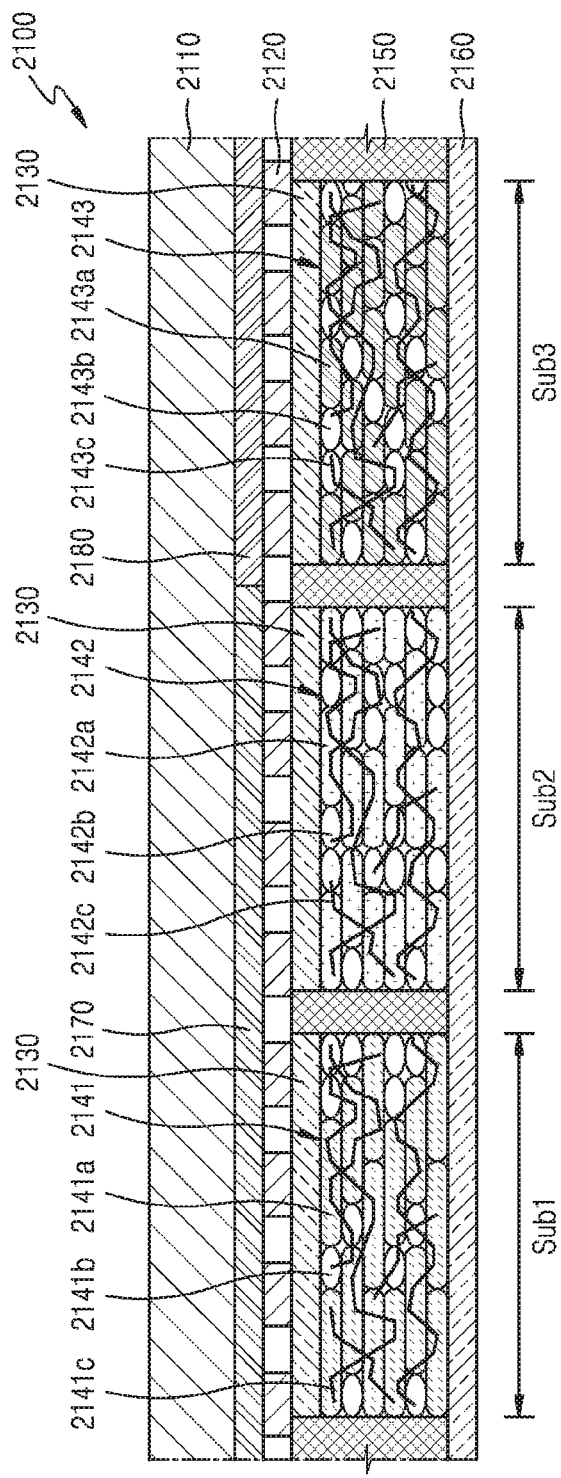
FIG. 2 is a cross-sectional view of a color filter substrate of a display apparatus, according to one or more exemplary embodiments.
Figure 3:
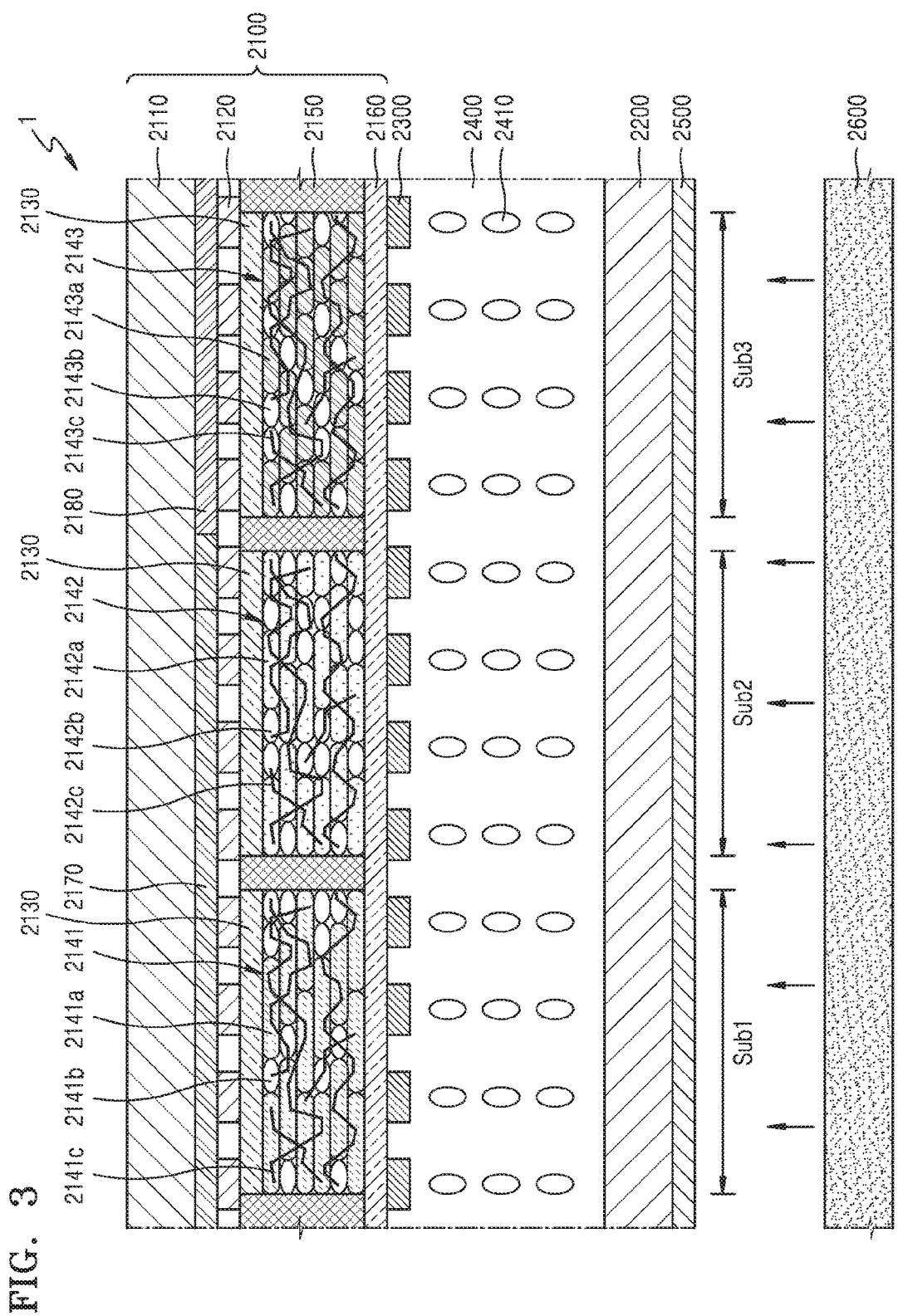
FIG. 3 is a cross-sectional view of a liquid crystal display (LCD) apparatus including the color filter substrate of FIG. 2, according to one or more exemplary embodiments.

FIG. 2 is a cross-sectional view of a color filter substrate of a display apparatus, according to one or more exemplary embodiments. FIG. 3 is a cross-sectional view of a liquid crystal display (LCD) apparatus including the color filter substrate of FIG. 2, according to one or more exemplary embodiments.

Referring to FIG. 3, the liquid crystal display apparatus 1 includes a second (e.g., bottom) substrate 2200 including a first sub-pixel region Sub1, a second sub-pixel region Sub2, and a third sub-pixel region Sub3, a liquid crystal layer 2400 arranged on the bottom substrate 2200, and the color filter substrate 2100 arranged on the liquid crystal layer 2400 to face the bottom substrate 2200. The color filter substrate 2100 includes a first (e.g., top) substrate 2110 facing the bottom substrate 2200; an electrode pattern 2120 disposed on a surface of the top substrate 2110, the surface facing the bottom substrate 2200; and a first light-converter 2141 including a first quantum rod 2141a, a second light-converter 2142 including a second quantum rod 2142a, and a third light-converter 2143 including an anisotropic material 2143a. The first light-converter 2141, the second light-converter 2142, and the third light-converter 2143 are arranged on the electrode pattern 2120 in correspondence with the first sub-pixel region Sub1, the second sub-pixel region Sub2, and the third sub-pixel region Sub3, respectively.

The bottom substrate 2200 may be an array substrate including a plurality of lines, such as a gate line (not shown), a data line (not shown), and the like, a driving circuit (not illustrated) including a switching device (not shown) for driving each of the pixels, a pixel electrode (not shown), and/or the like.

According to one or more exemplary embodiments, a polarizer 2500 may be disposed on a surface of the bottom substrate 2200. The surface on which the polarizer is formed may be opposite another surface of the bottom substrate 2200 that faces the color filter substrate 2100. The polarizer 2500 may have a determined polarizing axis, and only a component of light incident on the polarizer 2500 may pass the polarizer 2500. The component corresponds to the polarizing axis of the polarizer.

A backlight unit 2600 for radiating light to the bottom substrate 2200 may be arranged below the polarizer 2500. According to one or more exemplary embodiments, the backlight unit 2600 may emit blue light. The blue light may indicate light of visible light, the light having a wavelength of about 450 nm through about 495 nm. Light emitted from the backlight unit 2600 may be incident on the polarizer 2500, may be polarized in a determined direction, may pass through the bottom substrate 2200, and then may be incident on the liquid crystal layer 2400. The liquid crystal layer 2400 may include liquid crystals 2410 whose molecules are differently aligned according to voltage applied thereto. According to the alignment of the liquid crystals 2410, a polarization direction of the light incident on the liquid crystal layer 2400 may be changed. The light that passes through the liquid crystal layer 2400 may be incident on the color filter substrate 2100.

Referring to FIG. 2, the color filter substrate 2100 according to one or more exemplary embodiments includes the top substrate 2110 including the first sub-pixel region Sub1, the second sub-pixel region Sub2, and the third sub-pixel region Sub3; the electrode pattern 2120 arranged on the top substrate 2110; and the first light-converter 2141 including the first quantum rod 2141a, the second light-converter 2142 including the second quantum rod 2142a, and the third light-converter 2143 including the anisotropic material 2143a. The first light-converter 2141, the second light-converter 2142, and the third light-converter 2143 are arranged on the electrode pattern 2120 in correspondence with the first sub-pixel region Sub1, the second sub-pixel region Sub2, and the third sub-pixel region Sub3, respectively.

The color filter substrate 2100 of FIG. 2 may be similar to the color filter substrate 1100 of FIG. 1. As such, the color filter substrate 2100 of FIG. 2 will be described with respect to its difference from the color filter substrate 1100 of FIG. 1 to avoid obscuring exemplary embodiments described herein.

According to one or more exemplary embodiments, the first sub-pixel region Sub1, the second sub-pixel region Sub2, and the third sub-pixel region Sub3 may be a red sub-pixel region, a green sub-pixel region, and a blue sub-pixel region from which red light, green light, and blue light are emitted, respectively.

A notch filter 2170 may be disposed between the top substrate 2110 and the electrode pattern 2120 in correspondence with the first light-converter 2141 and the second light-converter 2142. That is, the notch filter 2170 may be arranged in the region that overlaps the first light-converter 2141 and the second light-converter 2142. The notch filter 2170 blocks only a particular frequency band component of incident light. In one or more exemplary embodiments, the notch filter 2170 may block blue light, and may not be arranged in a region corresponding to the third light-converter 2143. The notch filter 2170 may be disposed in the first sub-pixel region Sub1 and the second sub-pixel region Sub2, so that the notch filter 2170 can block blue light that is changelessly transmitted without being converted by the first light-converter 2141 and the second light-converter 2142. In this manner, the notch filter 2170 may block a range of wavelengths of blue light included in a spectrum of converted light in the first sub-pixel region Sub1 and the second sub-pixel region Sub2.

An organic layer 2180 may be arranged between the top substrate 2110 and the electrode pattern 2120 in correspondence with the third light-converter 2143. The organic layer 2180 may include a transparent material, and may be formed in a same layer as the notch filter 2170. The organic layer 2180 may have a same thickness as the notch filter 2170 to prevent a step difference from occurring due to the presence of the notch filter 2170.

The electrode pattern 2120 and an alignment layer 2130 are arranged on the notch filter 2170 and the organic layer 2180. The first light-converter 2141, the second light-converter 2142, and the third light-converter 2143 may be arranged on the alignment layer 2130. A partition wall 2150 is disposed between the first light-converter 2141 and the second light-converter 2142 on the electrode pattern 2120, and is disposed between the second light-converter 2142 and the third light-converter 2143 on the electrode pattern 2120. A planarization layer 2160 may be arranged on the first light-converter 2141, the second light-converter 2142, and the third light-converter 2143, as well as on the partition wall 2150.

According to one or more exemplary embodiments, the first light-converter 2141 may include the first quantum rod 2141a and liquid crystal 2143b, the second light-converter 2142 may include the second quantum rod 2142a and a liquid crystal 2142b, and the third light-converter 2143 may include an anisotropic material 2143a and a liquid crystal 2143b. The third light-converter 2143 may changelessly transmit blue light emitted from the backlight unit 2600 or may decrease a half-width of the incident blue light (e.g., change the intensity of the incident blue light) and then may emit the modified blue light to the outside of the liquid crystal display apparatus 1.

Lengths of short axes and/or long axes of the first quantum rod 2141a and the second quantum rod 2142a may be different from each other. According to one or more exemplary embodiments, the length of the long axis of the first quantum rod 2141a may be longer than the length of the long axis of the second quantum rod 2142a, the first quantum rod 2141a may convert the incident blue light to red light, and the second quantum rod 2142a may convert the incident blue light to green light. Blue light that is changelessly transmitted and is not converted by the first and second quantum rods 2141a and 2142a respectively included in the first and second light-converters 2141 and 2142 may be blocked by the notch filter 2170. In this manner, the color of the red and green light propagating from the first and second sub-pixels Sub1 and Sub2, respectively, may be relatively pure. As such, blue light may not be emitted to the outside of the liquid crystal display apparatus 1 from the first and second sub-pixel regions Sub1 and Sub2.

Light whose wavelength is changed by the first quantum rod 2141a and the second quantum rod 2142a and is externally emitted may have a spectrum having a narrow half-width. Due to the notch filter 2170, half-widths of spectrums corresponding to red light and green light of the first sub-pixel region Sub1 and the second sub-pixel region Sub2 may be further decreased. As such, color reproduction by the liquid crystal display apparatus 1 may be improved. Long axes of the liquid crystals 2141b, 2142b, and 2143b, the first quantum rod 2141a, the second quantum rod 2142a, and the anisotropic material 2143a may be aligned in a determined direction, and only a component of light incident on the first light-converter 2141, the second light-converter 2142, and the third light-converter 2143 and corresponding to the alignment direction of the long axes may pass through the first, second, and third light-converters 2141, 2142, and 2143.

According to one or more exemplary embodiments, the first light-converter 2141, the second light-converter 2142, and the third light-converter 2143 may further respectively include polymer compounds 2141c, 2142c, and 2143c. The polymer compounds 2141c, 2142c, and 2143c may maintain the aligned states of the liquid crystals 2141b, 2142b, and 2143b, the first quantum rod 2141a, the second quantum rod 2142a, and the anisotropic material 2143a. That is, after the liquid crystals 2141b, 2142b, and 2143b, the first quantum rod 2141a, the second quantum rod 2142a, and the anisotropic material 2143a are aligned in a determined direction due to voltage being applied to the electrode pattern 2120, and the alignment direction provided by the alignment layer 2130, the polymer compounds 2141c, 2142c, and 2143c may maintain positions of the liquid crystals 2141b, 2142b, and 2143b, the first quantum rod 2141a, the second quantum rod 2142a, and the anisotropic material 2143a to allow the liquid crystals 2141b, 2142b, and 2143b, the first quantum rod 2141a, the second quantum rod 2142a, and the anisotropic material 2143a to maintain their aligned states even if voltage is not applied to the electrode pattern 2120.

The first light-converter 2141, the second light-converter 2142, and the third light-converter 2143 may perform a same function as a polarizer, and, as such, the liquid crystal display apparatus 1 may only include the polarizer 2500 arranged below the liquid crystal layer 2400. In this manner, the liquid crystal display apparatus 1 need not include a polarizer above the liquid crystal layer 2400.

The liquid crystal display apparatus 1 controls the on/off operation of each sub-pixel using two polarizers with the liquid crystal layer 2400 disposed therebetween. According to one or more exemplary embodiments, since the first, second, and third light-converters 2141, 2142, and 2143 may function not only as a color filter, but also function as a polarizer, it is possible to drive the liquid crystal display apparatus 1 using only one polarizer. By doing so, manufacturing costs for the liquid crystal display apparatus 1 may be decreased, and a polarizing plate having a thickness of about 60 μm and including a polarizer, a supporting member for supporting the polarizer, and an adhesive member may be omitted. In this manner, a color shift and brightness deterioration that may otherwise occur at a side viewing angle due, at least in part, by a second polarizing plate may be prevented or decreased. As such, a relatively wide viewing angle may be realized. In addition, since an additional polarizing plate having a high light-absorbing rate may be omitted, a relatively higher light efficiency may be realized. This may further increase the display quality of the liquid crystal display apparatus 1.

According to one or more exemplary embodiments, alignment directions of the long axes of the first quantum rod 2141$a$, the second quantum rod 2142$a$, and the anisotropic material 2143$a$ may be substantially perpendicular to a polarizing axis of the polarizer 2500 arranged under the bottom substrate 2200. Therefore, when the polarization direction of light having passed through the polarizer 2500 is not changed by the liquid crystal layer 2400, the light cannot pass through the first light-converter 2141, the second light-converter 2142, and the third light-converter 2143. In this manner, the pixel may be considered to be in an off state (or condition). However, when the polarization direction is rotated by 90 degrees by the liquid crystal layer 2400, the light may pass through the first, second, and third light-converters 2141, 2142, and 2143. In this manner, the pixel may be considered to be in an on state. It is noted, however, that exemplary embodiments are not limited thereto. For instance, in another liquid crystal mode, the alignment directions of the long axes of the first quantum rod 2141$a$, the second quantum rod 2142$a$, and the anisotropic material 2143$a$ may be substantially parallel with the polarizing axis of the polarizer 2500 arranged under the bottom substrate 2200. In this manner, the on/off conditions of the pixels may be opposite.

The liquid crystal layer 2400 may be controlled by each of the first sub-pixel region Sub1, the second sub-pixel region Sub2, and the third sub-pixel region Sub3, and according to an alignment direction of the liquid crystal layer 2400, each of the first, second, and third sub-pixel regions Sub1, Sub2, and Sub3 may emit or may not emit light.

According to one or more exemplary embodiments, as shown in FIG. 3, a common electrode 2300 may be disposed between the color filter substrate 2100 and the liquid crystal layer 2400. The common electrode 2300 and a pixel electrode (not shown) included, for instance, in the bottom substrate 2200 may apply an electric field to the liquid crystal layer 2400, and, by doing so, the liquid crystals 2410 included in the liquid crystal layer 2400 may be aligned in a determined direction. As seen in FIG. 3, the common electrode 2300 is disposed and patterned between the color filter substrate 2100 and the liquid crystal layer 2400, but exemplary embodiments are not limited thereto. For instance, the common electrode 2300 may be included as part of or on the bottom substrate 2200, or may not be patterned and may be arranged on an entire (or substantially entire) surface of the color filter substrate 2100.

According to one or more exemplary embodiments, the liquid crystal display apparatus 1 may be configured to omit a polarizing plate, such that the manufacturing costs may be decreased and a relatively higher light efficiency and a relatively wider viewing angle may be obtained. In addition, since the first quantum rod 2141$a$, the second quantum rod 2142$a$, and the notch filter 2170 are capable of converting/filtering out a wavelength of incident light, the first quantum rod 2141$a$, the second quantum rod 2142$a$, and the notch filter 2170 may function as a color filter. In this manner, a color reproduction rate of the liquid crystal display apparatus 1 may also be improved that may also increase display quality.

A method of manufacturing the liquid crystal display apparatus 1 of FIG. 3 will now be described in association with FIGS. 4A through 4M. FIGS. 4A through 4M are respective cross-sectional views of the liquid crystal display apparatus 1 of FIG. 3 at various stages of manufacture, according to one or more exemplary embodiments. It is noted that the method of manufacturing the liquid crystal display 1 will first be described generally, and then described in more detail with reference to FIGS. 4A through 4M.

Referring to FIGS. 4A through 4M, the method of manufacturing the liquid crystal display apparatus 1 includes forming the color filter substrate 2100; disposing the bottom substrate 2200 to face the color filter substrate 2100 and bonding the bottom substrate 2200 and the color filter substrate 2100; and forming the liquid crystal layer 2400 by injecting liquid crystals 2410 between the bottom substrate 2200 and the color filter substrate 2100.

Forming of the color filter substrate 2100 includes: forming the electrode pattern 2120 over the top substrate 2110 including the first sub-pixel region Sub1, the second sub-pixel region Sub2, and the third sub-pixel region Sub3; forming a first material 2141' including a first quantum rod 2141$a$' and a liquid crystal 2141$b$', a second material 2142' including a second quantum rod 2142$a$' and a liquid crystal 2142$b$', and a third material 2143' including an anisotropic material 2143$a$' and a liquid crystal 2143$b$' in the first sub-pixel region Sub1, the second sub-pixel region Sub2, and the third sub-pixel region Sub3, respectively, on the electrode pattern 2120; and forming the first light-converter 2141, the second light-converter 2142, and the third light-converter 2143 by aligning the liquid crystals 2141$b$', 2142$b$', and 2143$b$' and long axes of the first quantum rod 2141$a$', the second quantum rod 2142$a$', and the anisotropic material 2143$a$' in a determined direction by applying voltage to the electrode pattern 2120.

According to one or more exemplary embodiments, after forming of the electrode pattern 2120, the method may further include forming the alignment layer 2130 to cover a portion of the electrode pattern 2120 and the partition walls 2150 to define the first sub-pixel region Sub1, the second sub-pixel region Sub2, and the third sub-pixel region Sub3 on the top substrate 2110. After forming the first light-converter 2141, the second light-converter 2142, and the third light-converter 2143, the method may further include forming the planarization layer 2160 to cover the first, second, and third light-converters 2141, 2142, and 2143, and the partition walls 2150.

Figure 4A:
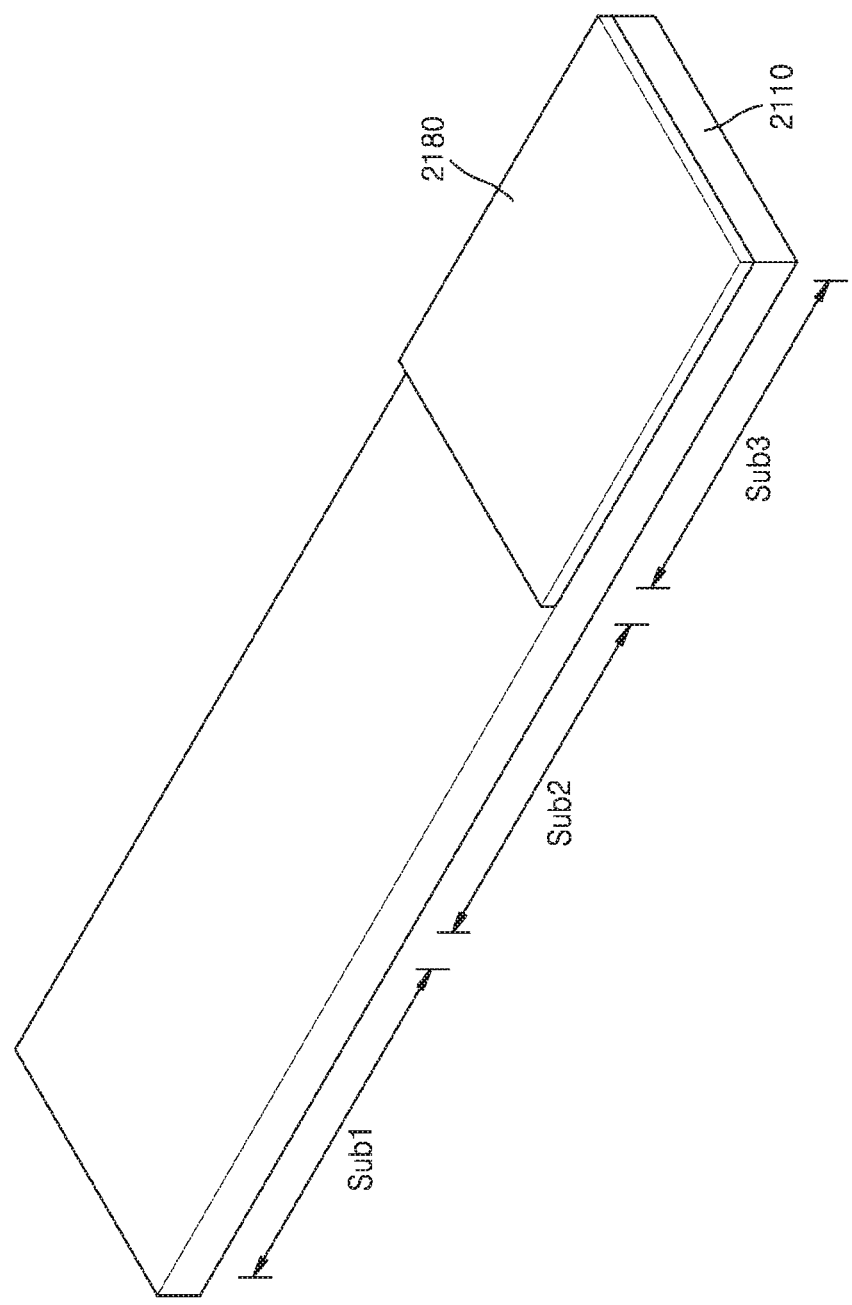
Figure 4B:
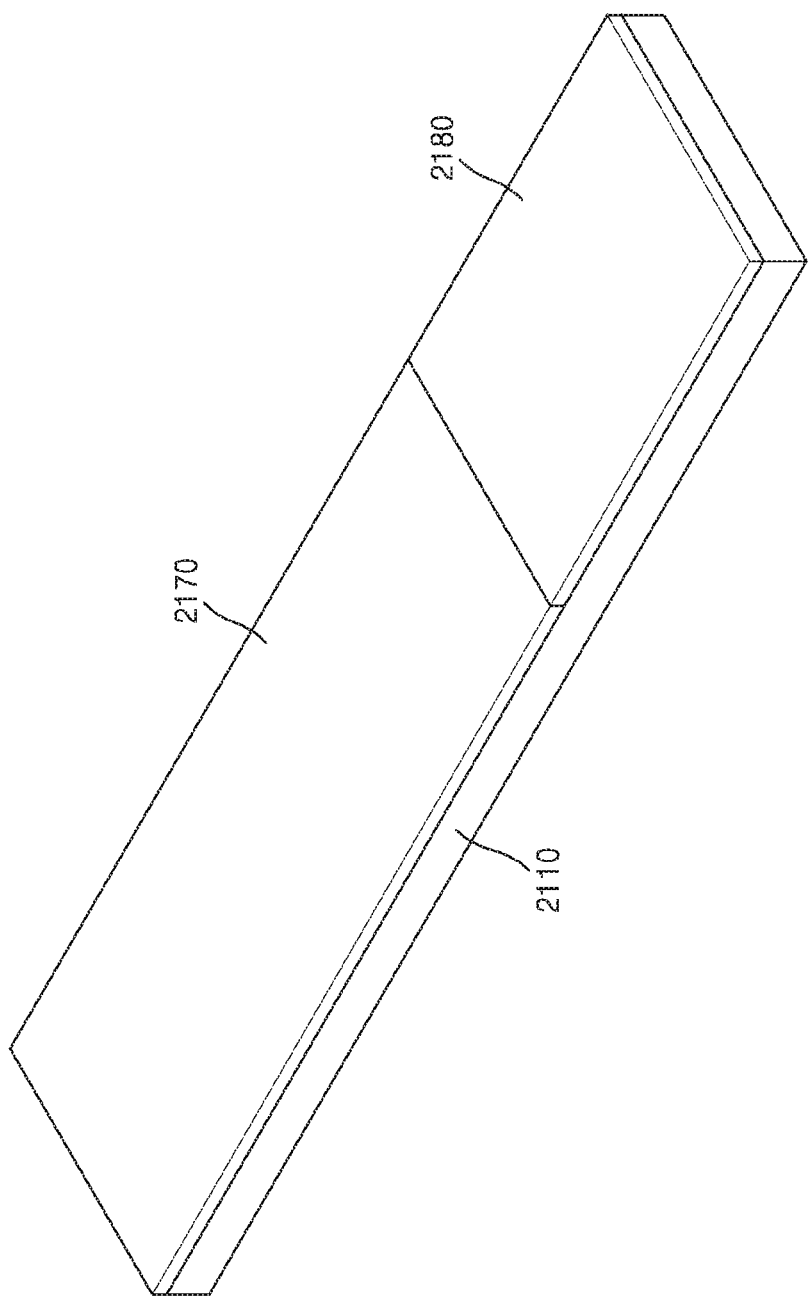

Referring to FIGS. 4A and 4B, before forming the electrode pattern 2120, the notch filter 2170 and the organic layer 2180 may be formed on the top substrate 2110 including the first sub-pixel region Sub1, the second sub-pixel region Sub2, and the third sub-pixel region Sub3. According to one or more exemplary embodiments, the organic layer 2180 may be formed on the top substrate 2110 in only the third sub-pixel region Sub3 via a photolithography process, and then the notch filter 2170 may be formed on the top substrate 2110 in only the first sub-pixel region Sub1 and the second sub-pixel region Sub 2, which may correspond to an exposed region of the top substrate 2110. The notch filter 2170 may be a filter to block blue light, and the notch filter 2170 and the organic layer 2180 may be formed in the same layer as one another and may have substantially the same thickness as one another. It is noted that the method and order of forming the organic layer 2180 and the notch filter 2170 are not limited to the aforementioned descriptions. For instance, the notch filter 2170 may be formed first and then the organic layer 2180 may be formed, or the forming of the organic layer 2180 may be skipped.

Figure 4C:
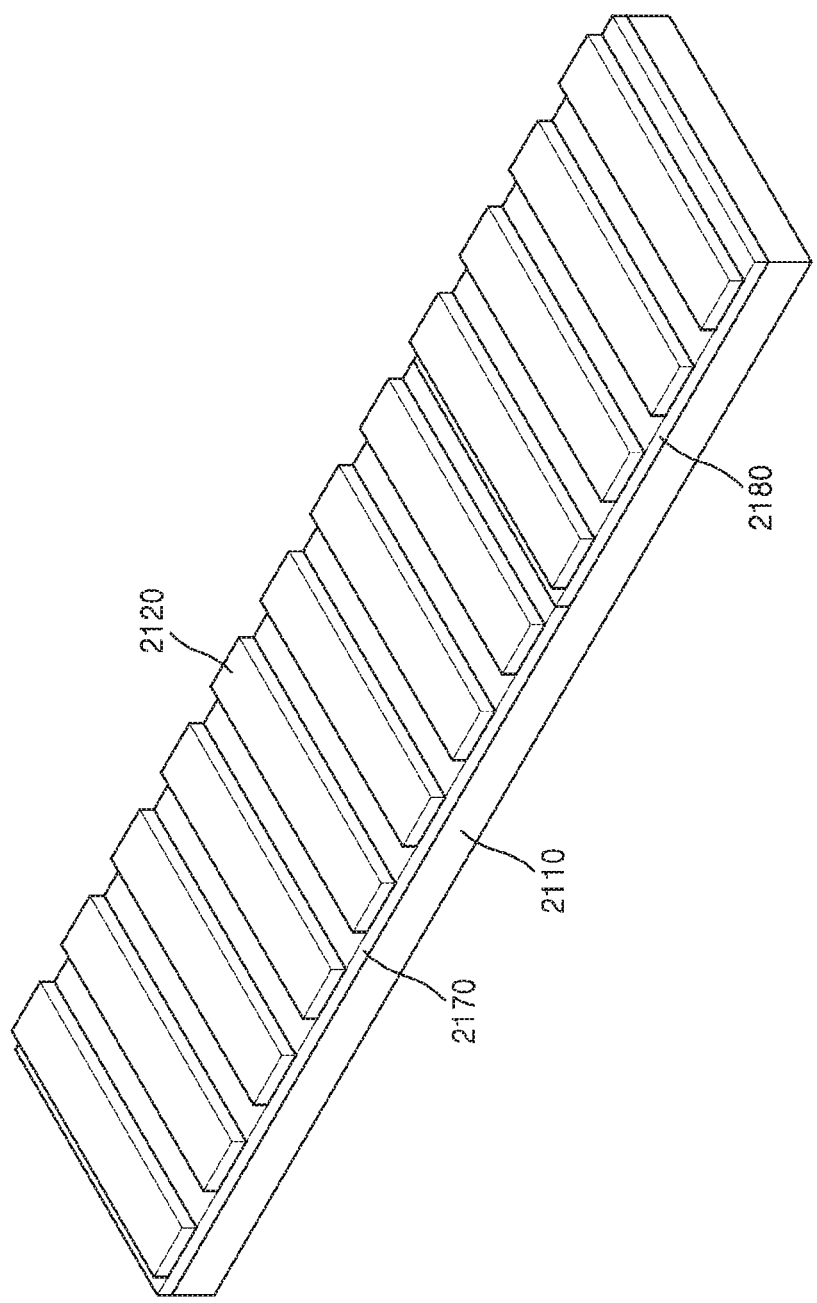

Referring to FIG. 4C, the electrode pattern 2120 may be formed on the notch filter 2170 and the organic layer 2180. The electrode pattern 1120 may include a transparent material, such as ITO, and may include a plurality of patterned electrodes.

Figure 4D:
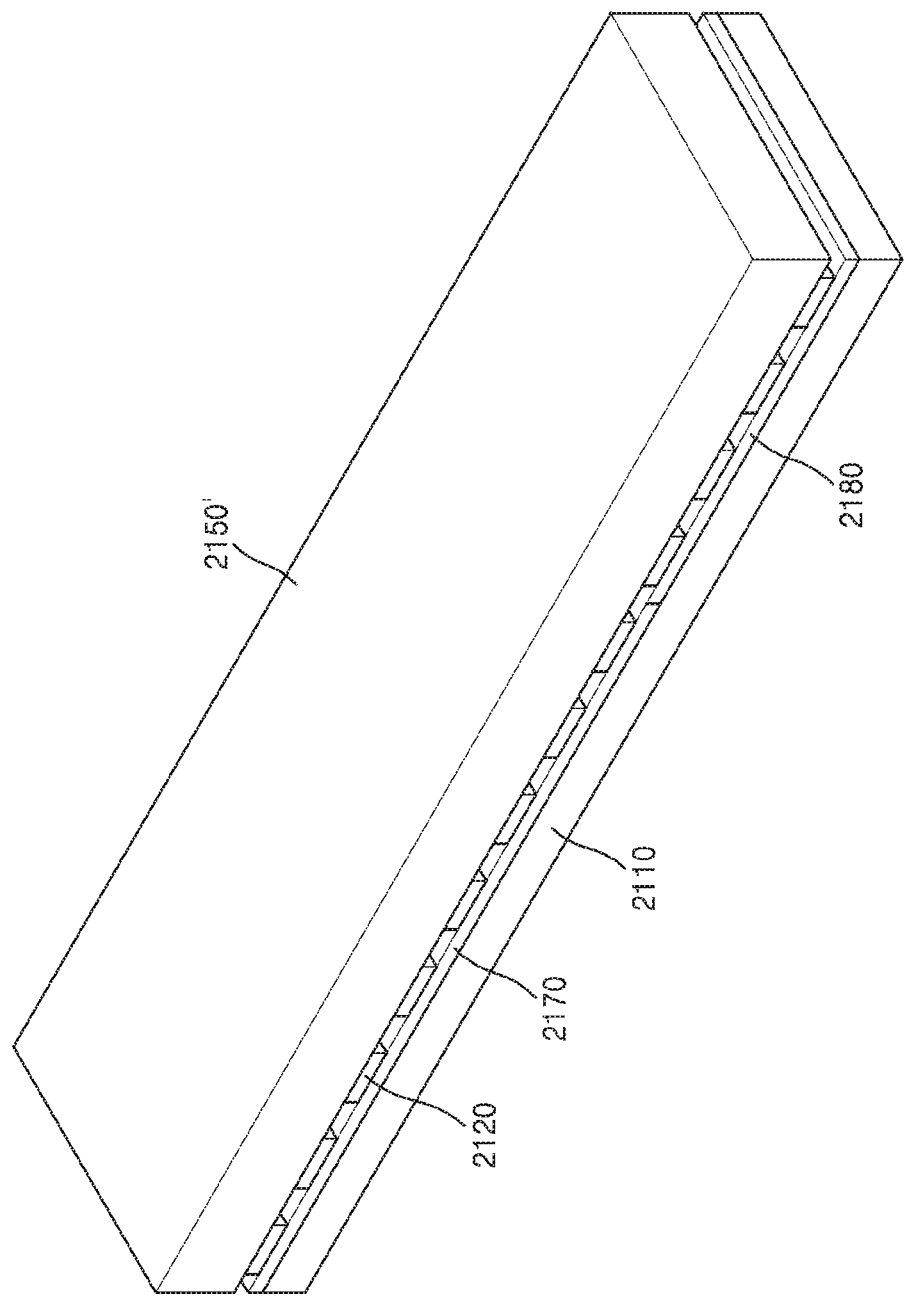
Figure 4E:
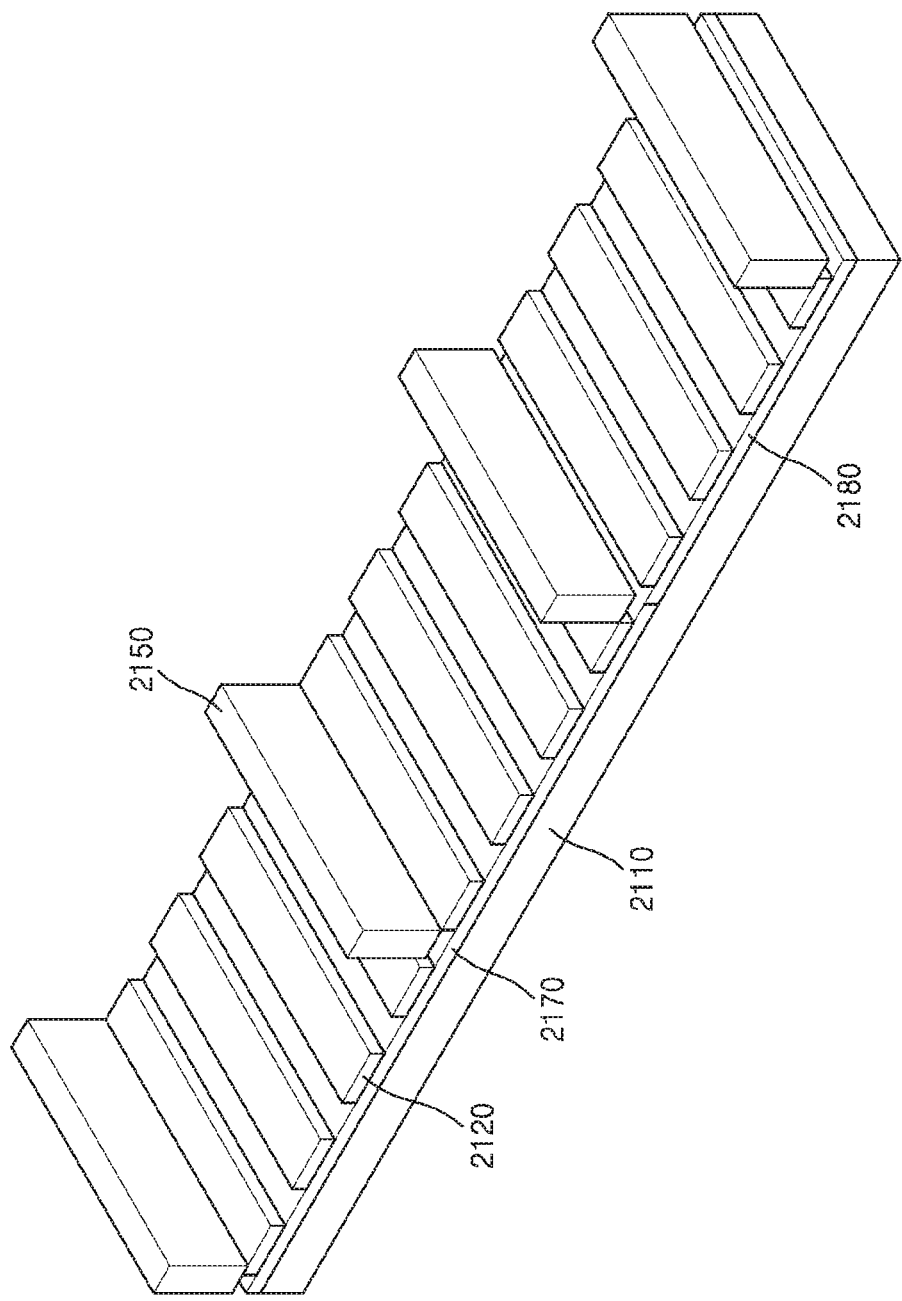

Referring to FIGS. 4D and 4E, a material 2150' that will later become the partition walls 2150 may be formed on the top substrate 2110 to cover the electrode pattern 2120. The material 2150' may be patterned to form the partition walls 2150, which define the first sub-pixel region Sub1, the second sub-pixel region Sub2, and the third sub-pixel region Sub3. The partition wall 2150 may include the material 2150' that absorbs light. In one or more exemplary embodiments, the material 2150' may be formed over an entire surface of the electrode pattern 2120, and light may be radiated only to a region where the partition wall 2150 are to be formed, and then a developing process may be performed. As part of the developing process, a portion of the material 2150' that was not radiated with light is removed, such that the partition walls 2150 may be formed.

Figure 4F:
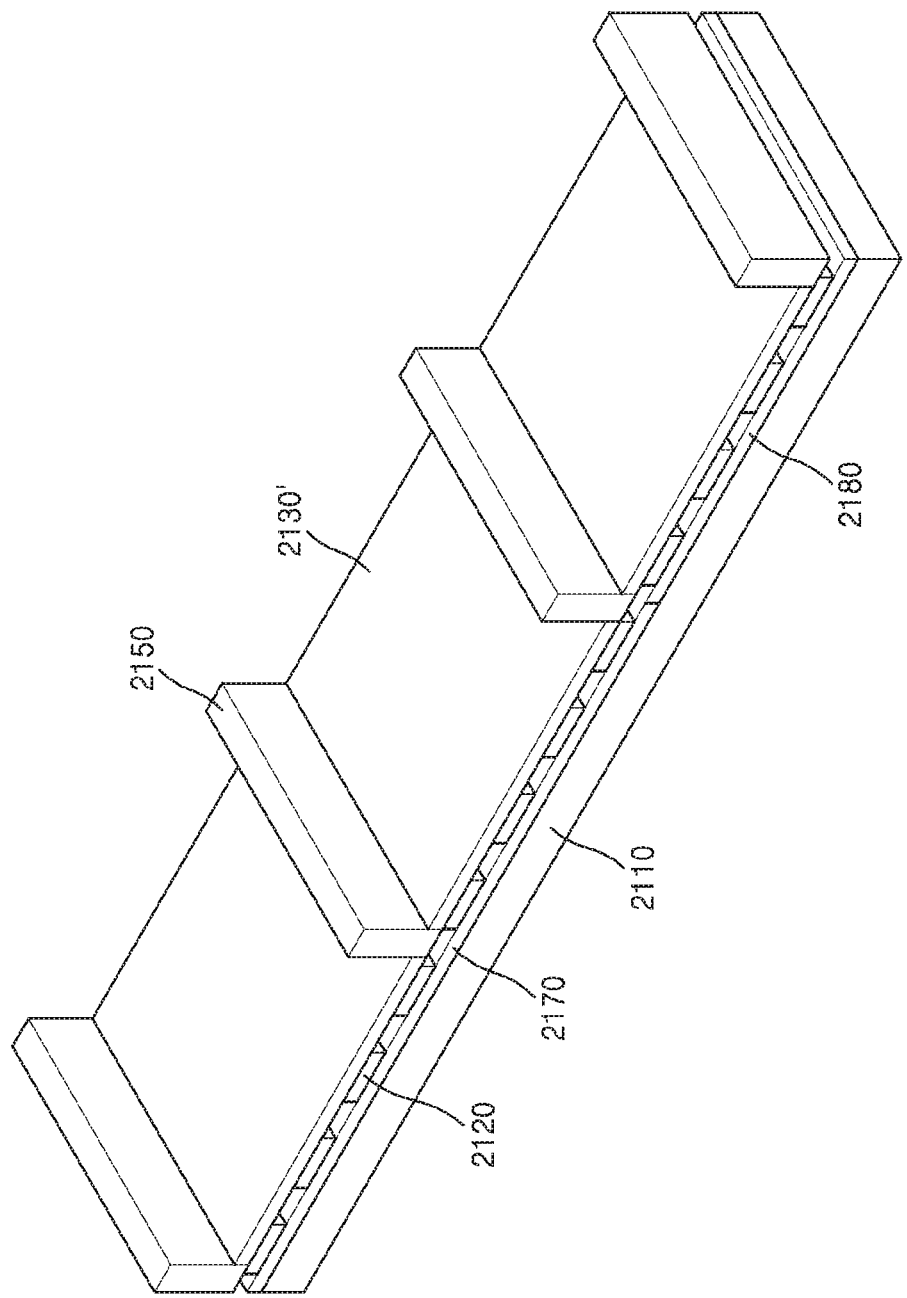
Figure 4G:
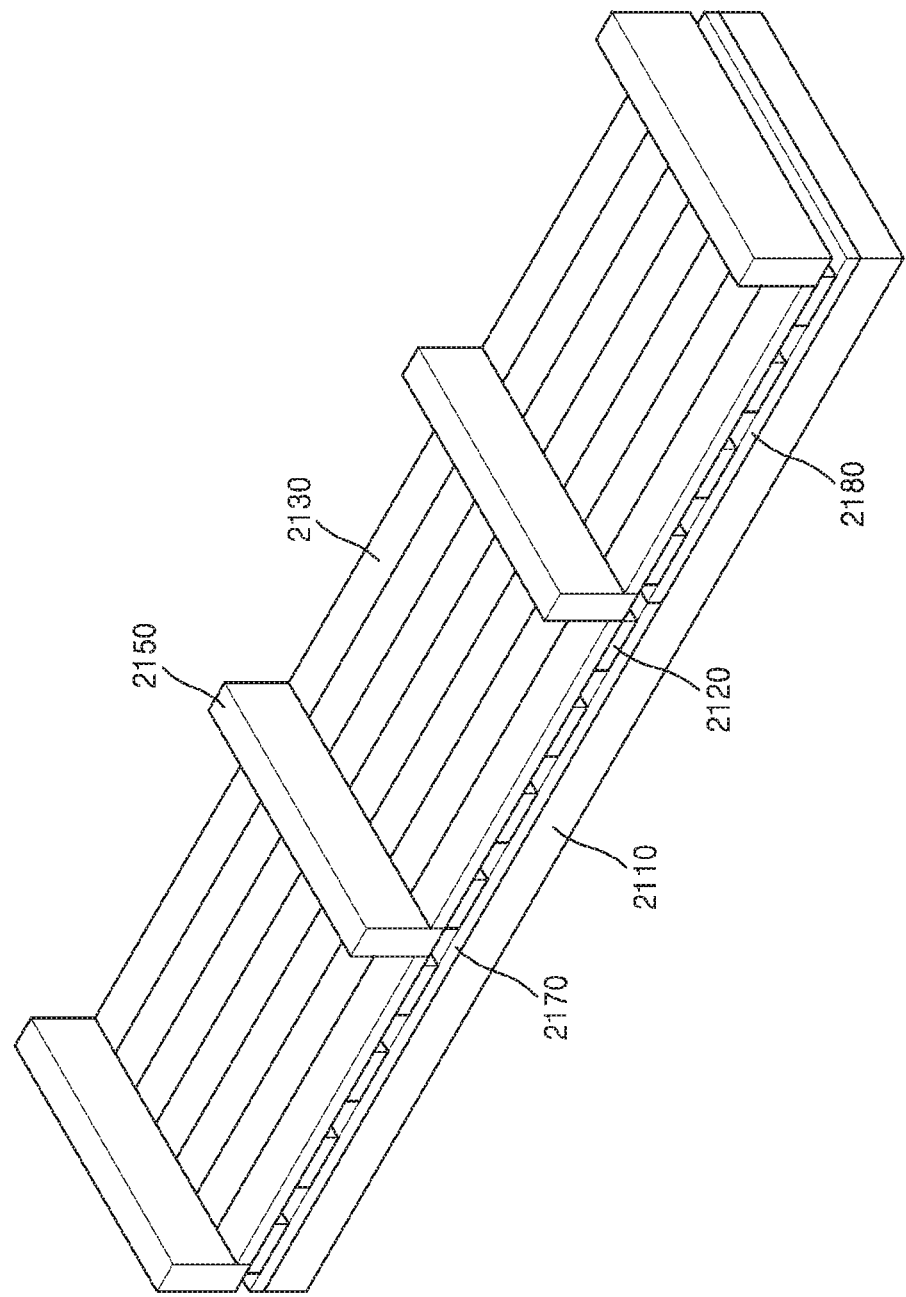

Referring to FIGS. 4F and 4G, a material 2130' that will later form the alignment layer 2130 is formed to cover a portion of the electrode pattern 2120 on the top substrate 2110. The material 230' is aligned to form the alignment layer 2130. For the alignment, any suitable method, such as rubbing, alignment using light or an ion beam, or the like, may be used. The material 2130' that forms the alignment layer 2130 may be coated in regions defined between the partition walls 2150. In this manner, the alignment layer 2130 may include patterns that are separated from each other by the partition walls 2150 and are arranged in the first sub-pixel region Sub1, the second sub-pixel region Sub2, and the third sub-pixel region Sub3, respectively.

Figure 4H:
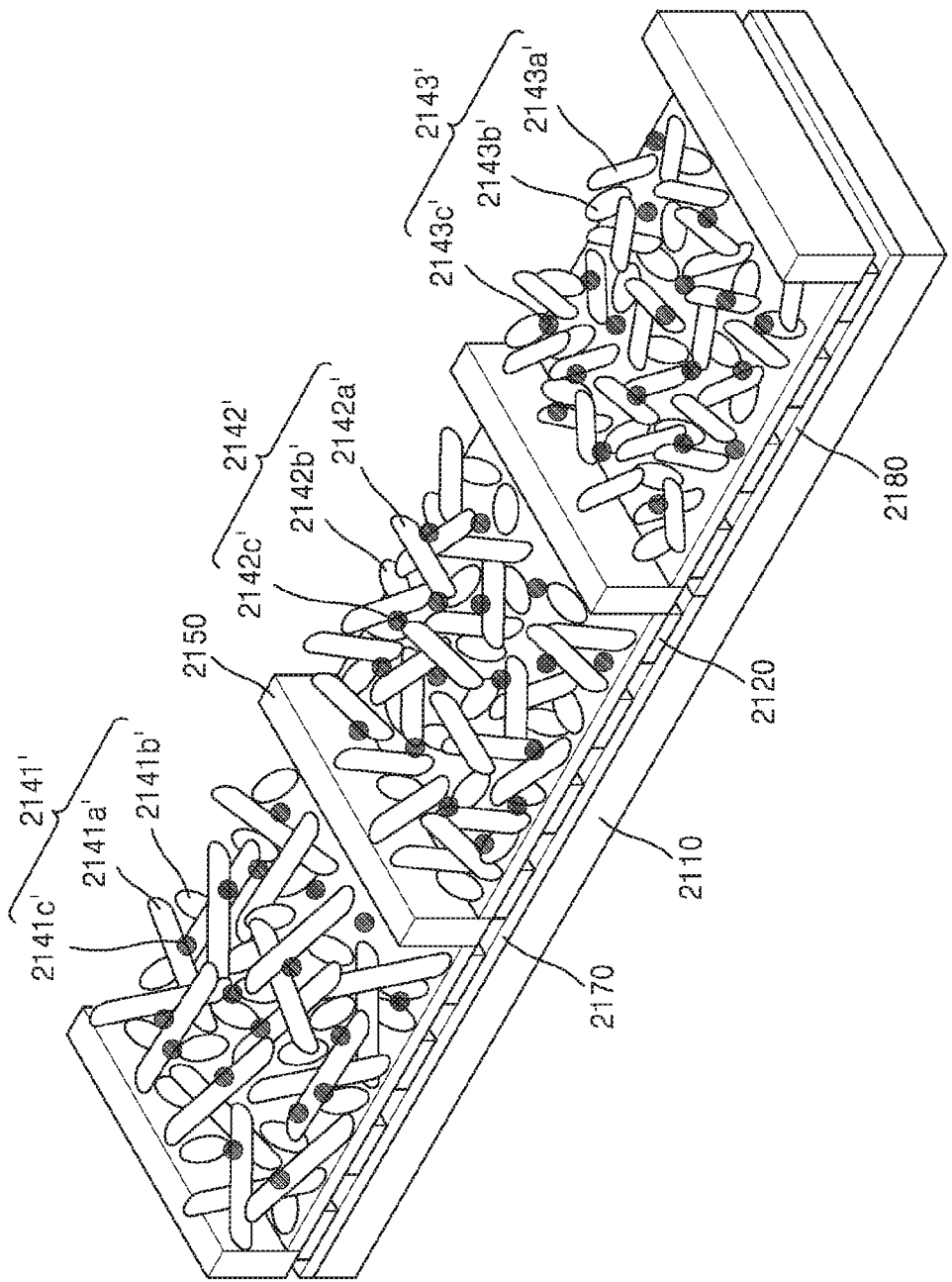

Referring to FIG. 4H, the first material 2141' including the first quantum rod 2141$a'$ and the liquid crystal 2141$b'$, the second material 2142' including the second quantum rod 2142$a'$ and the liquid crystal 2142$b'$, and the third material 2143' including an anisotropic material 2143$a'$ and the liquid crystal 2143$b'$ may be respectively formed in the first sub-pixel region Sub1, the second sub-pixel region Sub2, and the third sub-pixel region Sub3 that are defined by the partition walls 2150. According to one or more exemplary embodiments, the first material 2141', the second material 2142', and the third material 2143' may further include monomers 2141$c'$, 2142$c'$, and 2143$c'$, respectively.

Figure 4I:
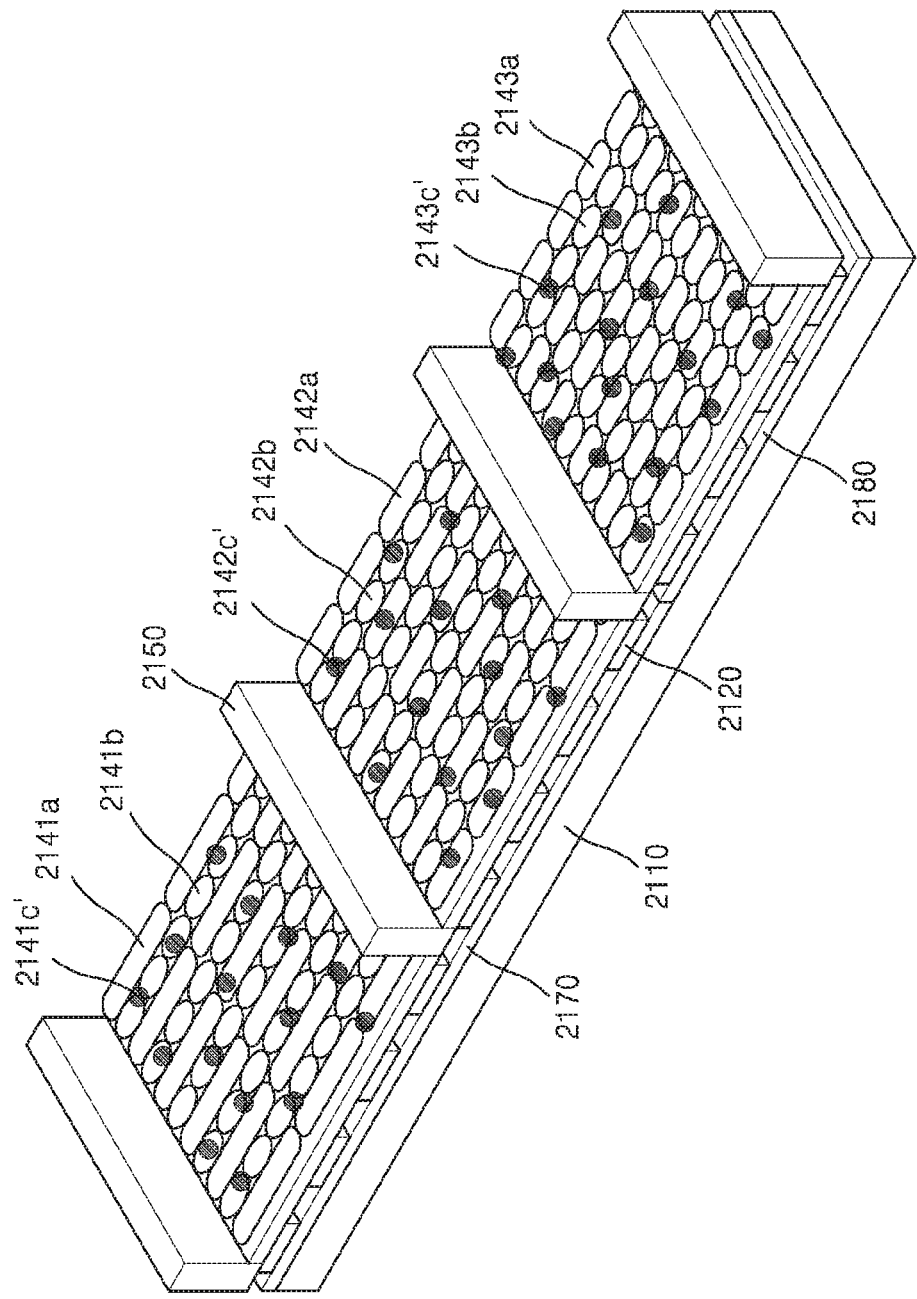

Referring to FIG. 4I, after the first material 2141', the second material 2142', and the third material 2143' are formed, voltage is applied to the electrode pattern 2120 that causes, at least in part, the first quantum rod 2141$a'$, the second quantum rod 2142$a'$, the anisotropic material 2143$a'$, and the liquid crystals 2141$b'$, 2142$b'$, and 2143$b'$ to be aligned. After alignment, the monomers 2141$c'$, 2142$c'$, and 2143$c'$ may be polymerized by radiating ultraviolet light or applying heat thereto.

Figure 4J:
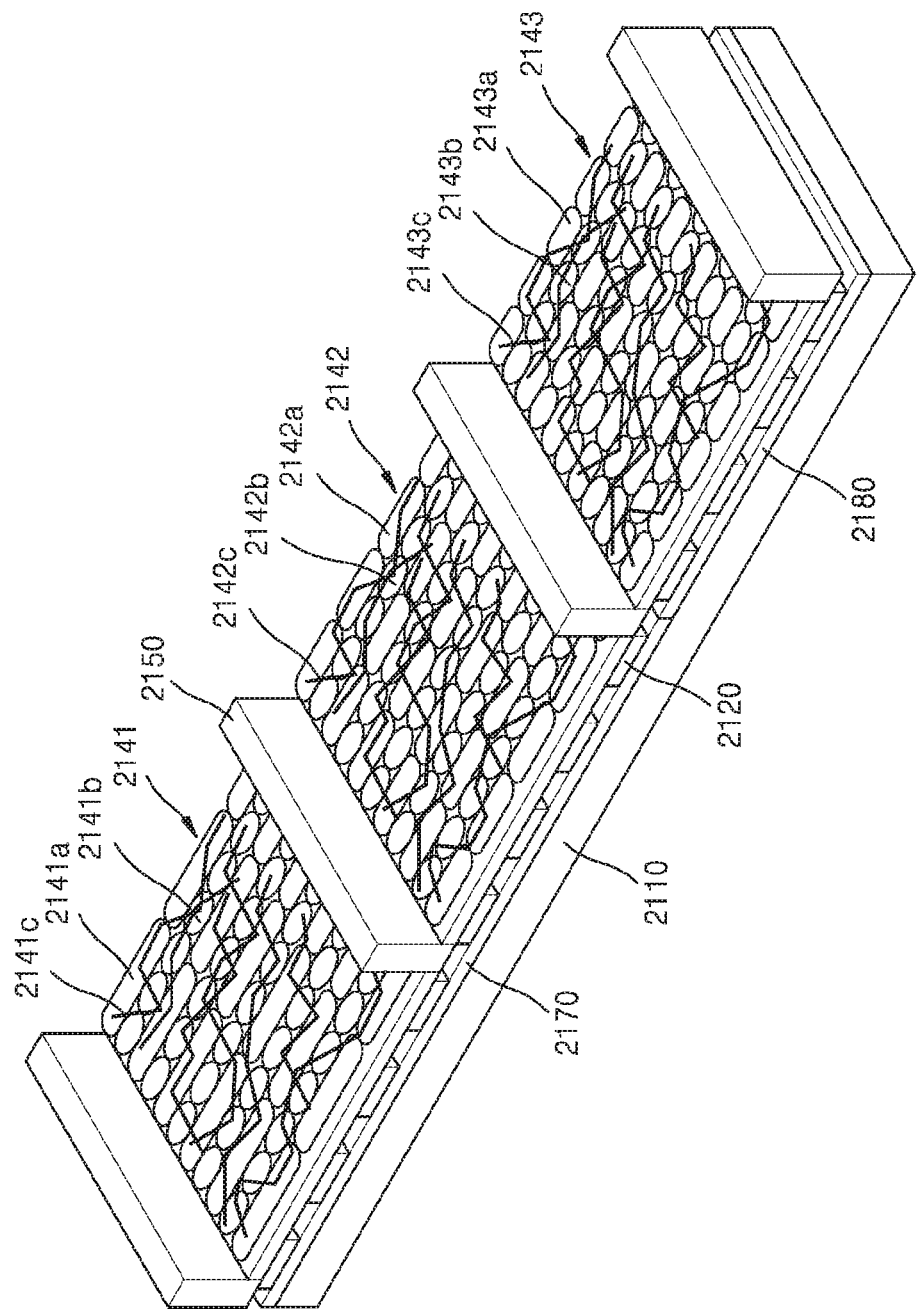

As shown in FIG. 4J, due to the polymerization, the monomers 2141$c'$, 2142$c'$, and 2143$c'$ may be polymerized to form the polymer compounds 2141$c$, 2142$c$, and 2143$c$ that maintain the aligned states of the first quantum rod 2141$a$, the second quantum rod 2142$a$, the anisotropic material 2143$a$, and the liquid crystals 2141$b$, 2142$b$, and 2143$b$. Via processes shown in FIGS. 4H through 4J, the first light-converter 2141 (including the first quantum rod 2141$a$, the liquid crystal 2141$b$, and the polymer compound 2141$c$), the second light-converter 2142 (including the second quantum rod 2142$a$, the liquid crystal 2142$b$, and the polymer compound 2142$c$), and the third light-converter 2143 (including the anisotropic material 2143$a$, the liquid crystal 2143$b$, and the polymer compound 2143$c$) may be formed on the alignment layer 2130 between partition walls 2150.

Figure 4K:
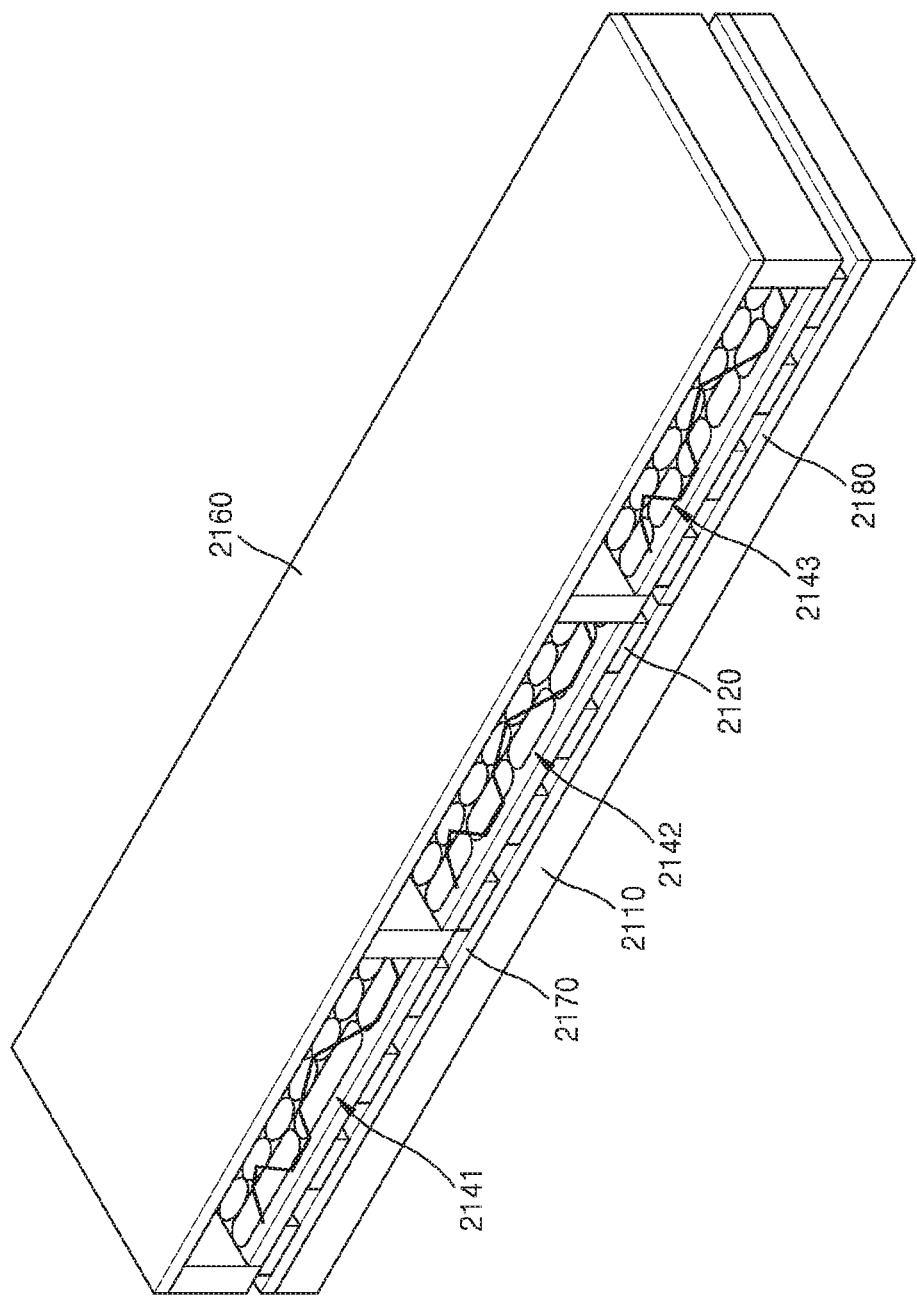
Figure 4L:
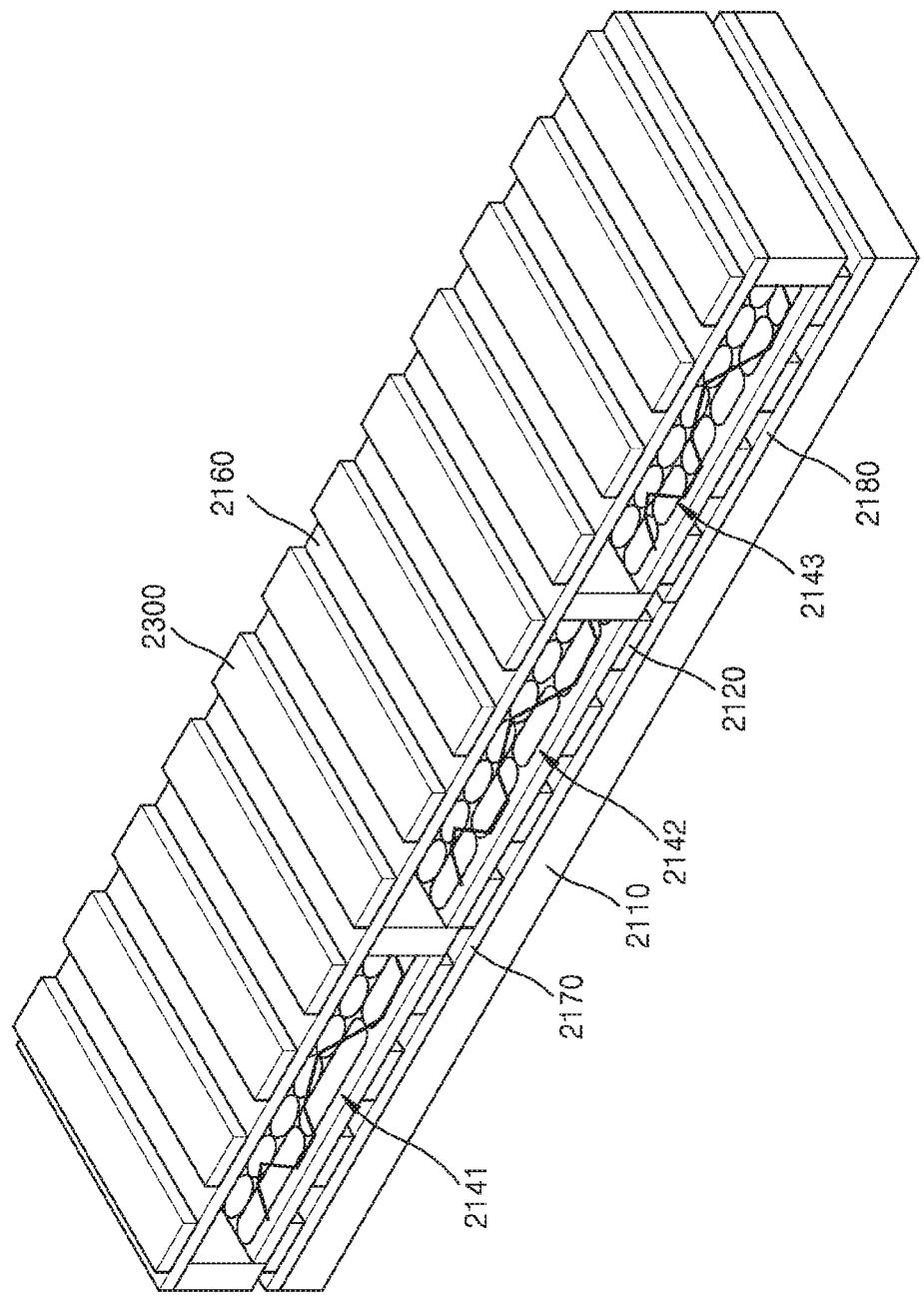

Referring to FIGS. 4K and 4L, the planarization layer 2160 may be formed on the alignment layer 2130 so as to cover the first light-converter 2141, the second light-converter 2142, and the third light-converter 2143, as well as to cover the partition walls 2150. The common electrode 2300 may be formed on the planarization layer 2160. The planarization layer 2160 may include an overcoat layer or various transparent organic materials and may encapsulate and planarize the first light-converter 2141, the second light-converter 2142, and the third light-converter 2143. The common electrode 2300 may be a transparent electrode, such as ITO, or the like. When a common voltage is applied to the common electrode 2300, the common electrode 2300 and pixel electrodes (not shown) that are respectively arranged in the first, second, and third sub-pixel regions Sub1, Sub2, and Sub3 may apply an electric field to the liquid crystal layer 2400. According to one or more exemplary embodiments, the common electrode 2300 may be patterned, but exemplary embodiments are not limited thereto. It is also noted that the common electrode 2300 may be arranged over an entire (or substantially entire) surface of the planarization layer 2160.

Via processes shown in FIGS. 4A through 4K, the color filter substrate 2100 may be formed, and via a process shown in FIG. 4L, the common electrode 2300 disposed over the color filter substrate 2100 may be formed. Referring to FIG. 4M, the bottom substrate 2200 may be disposed to face the color filter substrate 2100, and then the color filter substrate 2100 and the bottom substrate 2200 may be bonded together.

According to one or more exemplary embodiments, the polarizer 2500 may be disposed on a surface of the bottom substrate 2200, the surface being opposite another surface of the bottom substrate 2200 that faces the color filter substrate 2100. The polarizer 2500 may be formed on the bottom substrate 2200 before or after the bottom substrate 2200 and the color filter substrate 2100 are bonded together. A polarizing axis of the polarizer 2500 may be substantially perpendicular to an alignment direction of the long axes of the first quantum rod 2141$a$ and the second quantum rod 2142$a$.

Referring back to FIG. 3, liquid crystals are injected between the bottom substrate 2200 and the color filter substrate 2100. In this manner, the liquid crystal layer 2400 including the liquid crystals 2410 may be formed.

According to one or more embodiments, the method of manufacturing the liquid crystal display apparatus 1 enables formation of the first light-converter 2141, the second light-converter 2142, and the third light-converter 2143 that may function as a color filter. Also, the method of manufacturing the liquid crystal display apparatus 1 provides a method of easily aligning the liquid crystals 2141b, 2142b, and 2143b, the first quantum rod 2141a, the second quantum rod 2142a, and the anisotropic material 2143a to allow the first light-converter 2141, the second light-converter 2142, and the third light-converter 2143 to function as polarizers.

Figure 5:
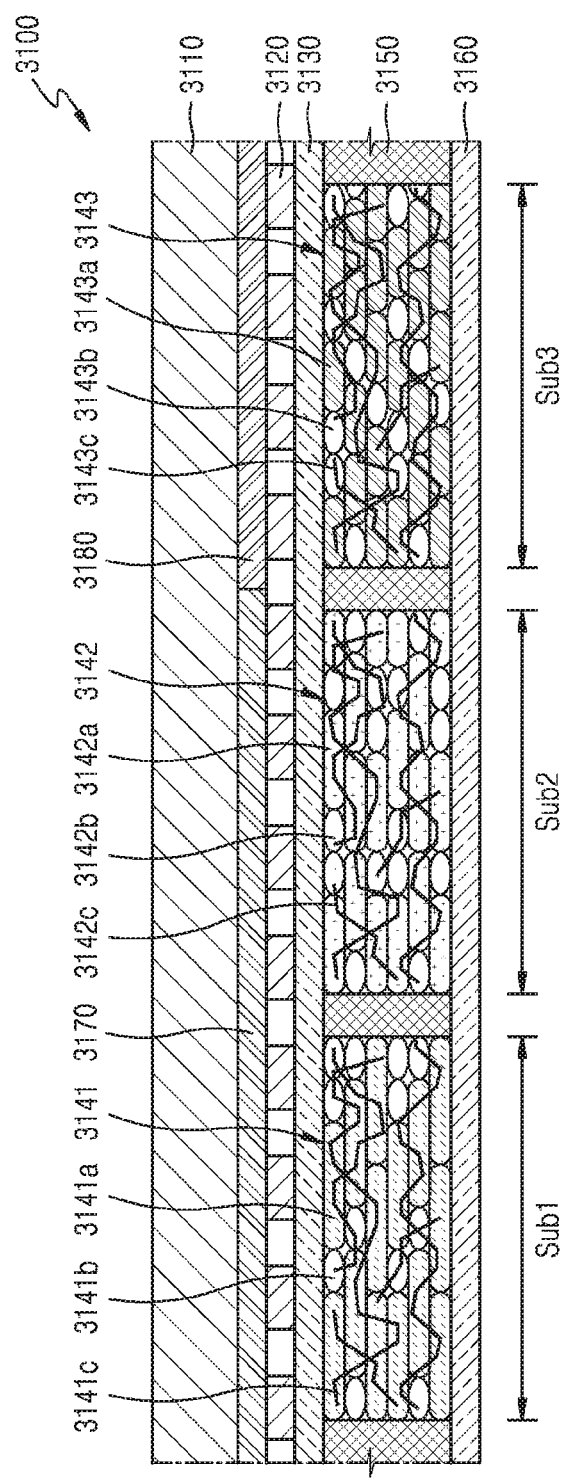
FIG. 5 is a cross-sectional view of a color filter substrate of a display apparatus, according to one or more exemplary embodiments.
Figure 6A:
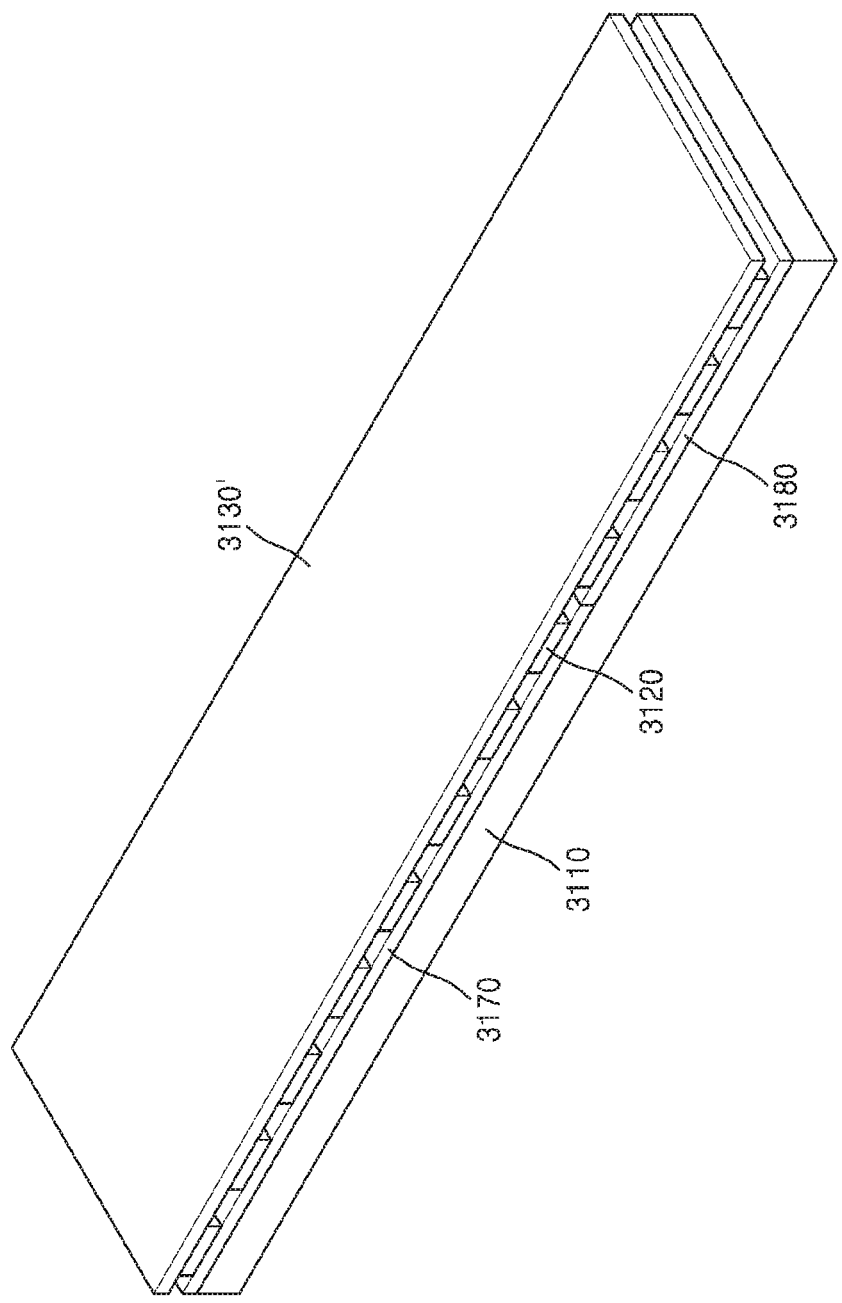
FIGS. 6A, 6B, and 6C are respective cross-sectional views of the color filter substrate of FIG. 5 at various stages of manufacture, according to one or more exemplary embodiments.
Figure 6B:
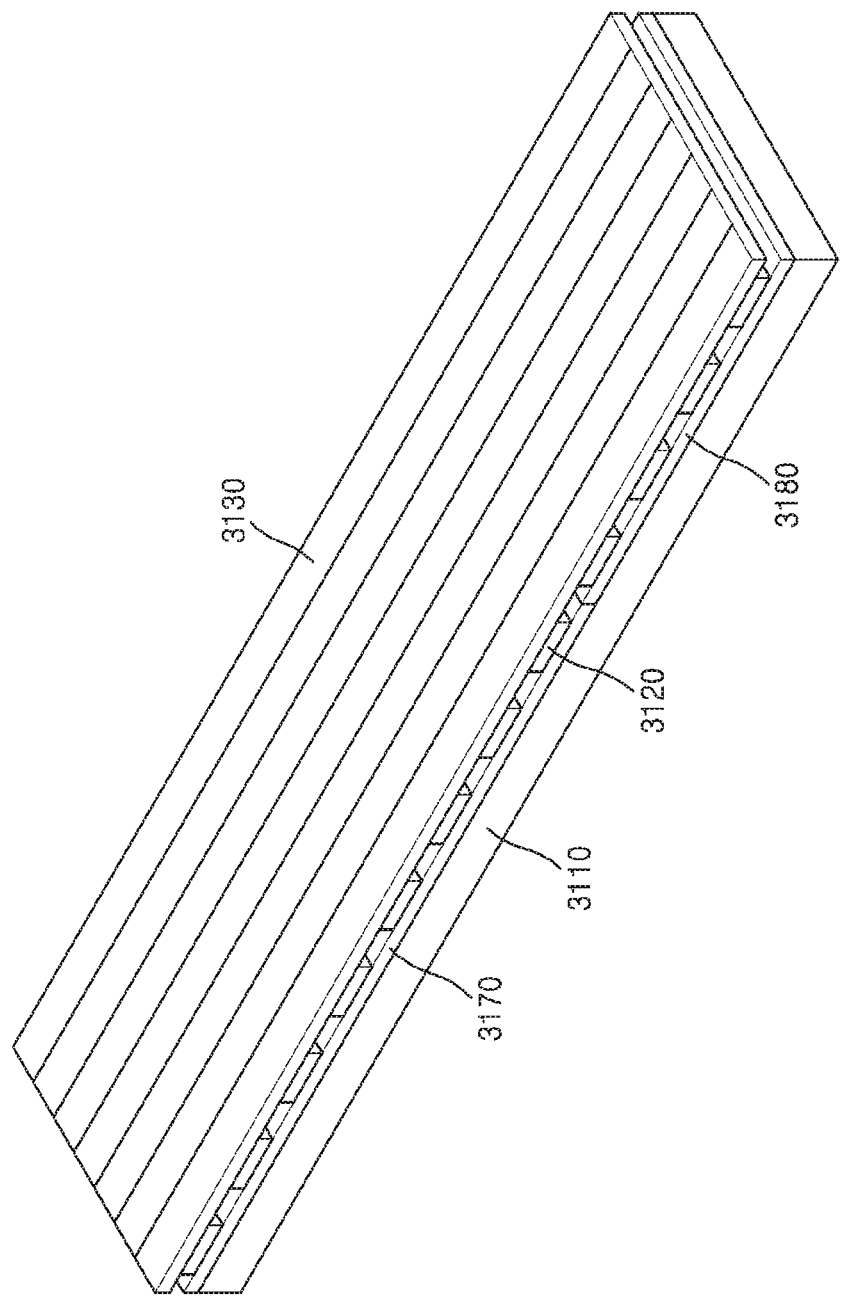
Figure 6C:
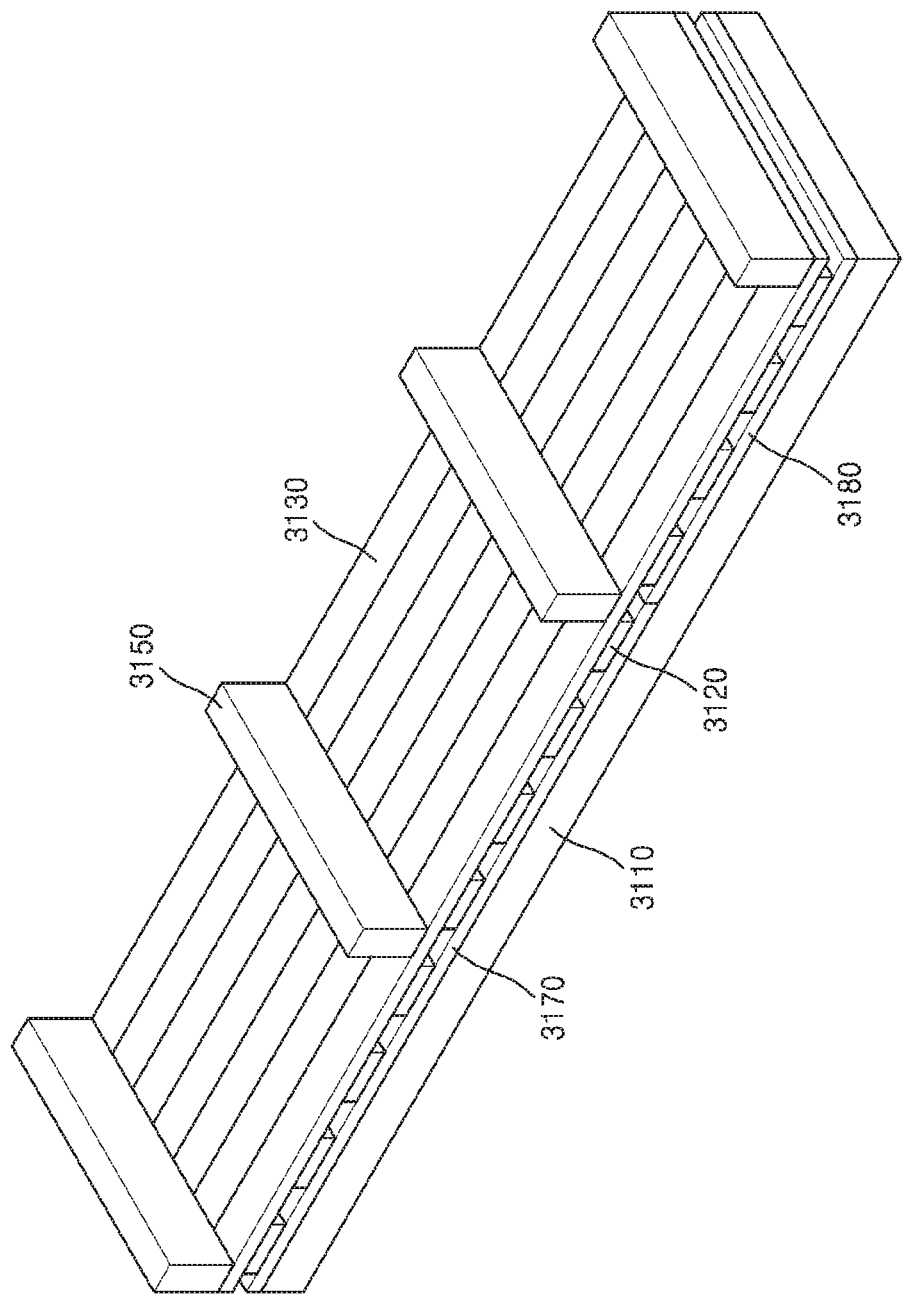

FIG. 5 is a cross-sectional view of a color filter substrate of a display apparatus, according to one or more exemplary embodiments. FIGS. 6A through 6C are respective cross-sectional views of the color filter substrate of FIG. 5 at various stages of manufacture, according to one or more exemplary embodiments.

Referring to FIG. 5, except an alignment layer 3130 and partition walls 3150, the color filter substrate 3100 of FIG. 5 is the same as the color filter substrate 2100 of FIG. 2. That is, the color filter substrate 3100 of FIG. 5 may be different from the embodiment of FIG. 2 in which the partition wall 3150 may be disposed on the alignment layer 3130. As such, the color filter substrate 3100 of FIG. 5 is primarily described with respect to the alignment layer 3130 and the partition walls 3150 to avoid obscuring exemplary embodiments described herein. The same is also true for the manufacturing process described in association with FIGS. 6A through 6C.

The color filter substrate 3100 of FIG. 5 includes a top substrate 3110 including a first sub-pixel region Sub1, a second sub-pixel region Sub2, and a third sub-pixel region Sub3; an electrode pattern 3120 disposed on the top substrate 3110; and a first light-converter 3141 including a first quantum rod 3141a, a second light-converter 3142 including a second quantum rod 3142a, and a third light-converter 3143 including an anisotropic material 3143a. The first light-converter 3141, the second light-converter 3142, and the third light-converter 3143 are arranged on the electrode pattern 3120 in correspondence with the first sub-pixel region Sub1, the second sub-pixel region Sub2, and the third sub-pixel region Sub3, respectively.

The alignment layer 3130 to cover the electrode pattern 3120 is arranged on the top substrate 3110, and the partition wall 3150 may be disposed between the first light-converter 3141 and the second light-converter 3142 and may be disposed between the second light-converter 3142 and the third light-converter 3143 on the alignment layer 3130. The partition wall 3150 may be formed of a light-absorbing material, and may define the first sub-pixel region Sub1, the second sub-pixel region Sub2, and the third sub-pixel region Sub3.

The notch filter 3170 may be disposed between the top substrate 3110 and the electrode pattern 3120 in correspondence with the first light-converter 3141 and the second light-converter 3142. An organic layer 3180 may be disposed in a region between the top substrate 3110 and the electrode pattern 3120 in correspondence with the third light-converter 3143. That is, the organic layer 3180 may be formed where the notch filter 3170 is not disposed.

A planarization layer 3160 including a transparent insulating material may be disposed on the first light-converter 3141, the second light-converter 3142, and the third light-converter 3143, as well as on the partition walls 3150. In this manner, the planarization layer 3160 may encapsulate the first, second, and third light-converters 3141, 3142, and 3143. The planarization layer 3160 may include various organic materials appropriate to function as an overcoat layer or performing a planarization function.

According to one or more exemplary embodiments, the first light-converter 3141 may include a first quantum rod 3141a, a liquid crystal 3141b, and a polymer compound 3141c, the second light-converter 3142 may include a second quantum rod 3142a, a liquid crystal 3142b, and a polymer compound 3142c, and a third light-converter 3143 may include an anisotropic material 3143a, a liquid crystal 3143b, and a polymer compound 3143c.

Referring to FIGS. 6A through 6C, a material 3130' that forms the alignment layer 3130 is coated to cover the electrode pattern 3120 over the top substrate 3110 and then is aligned, so that the alignment layer 3130 may be formed. For the alignment, a generally-used method such as rubbing, alignment using light or an ion beam, or the like may be used. After the alignment layer 3130 is formed, the partition walls 3150 for defining the first sub-pixel region Sub1, the second sub-pixel region Sub2, and the third sub-pixel region Sub3 may be formed over the alignment layer 3130.

The partition wall 3150 may include the light-absorbing material. The material may be formed over an entire surface of the alignment layer 3130, light may be irradiated only to a region where the partition wall 3150 is to be formed, and then a developing process may be performed. Via the developing process, a portion of the material to which the light is not irradiated is removed, so that the partition wall 3150 may be formed.

FIGS. 6A through 6C illustrate respective cross-sectional views of the color filter substrate 3100 of FIG. 5 at stages of manufacture corresponding to the formation of the alignment layer 3130 and the partition walls 3150. The other stages of manufacture are the same as those described in association with FIGS. 4A through 4C and FIGS. 4H through 4K. As such, duplicative descriptions have been omitted to avoid obscuring exemplary embodiments.

According to one or more exemplary embodiments, the alignment layer 3130 is formed and then the partition walls 3150 are formed on the alignment layer 3130, which is different from the color filter substrate 2100 of FIGS. 2 and 3, in which the partition wall 3150 is patterned and then the alignment layer 3130 is formed.

Figure 7:
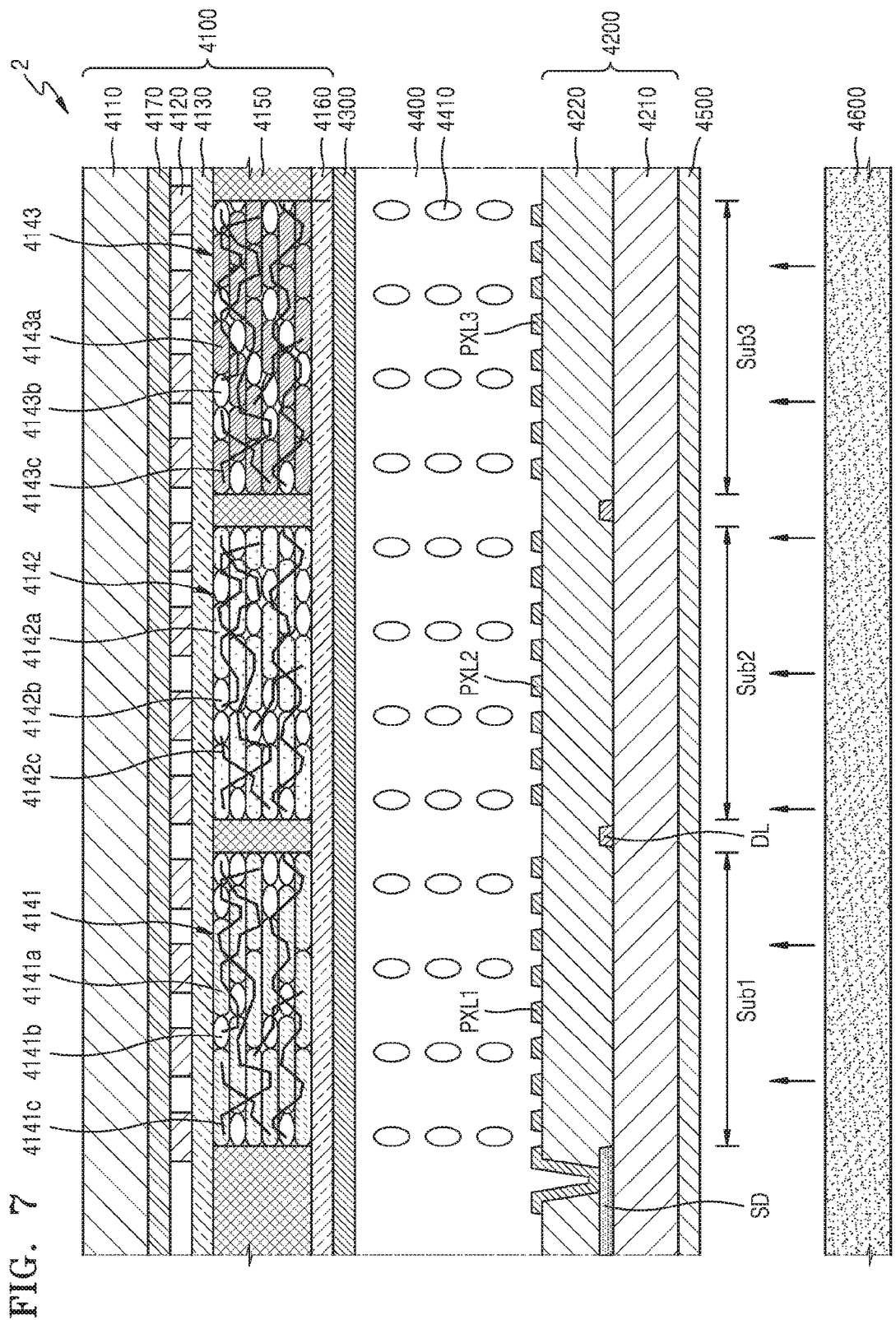
FIG. 7 is a cross-sectional view of an LCD apparatus, according to one or more exemplary embodiments.

FIG. 7 is a cross-sectional view of a liquid crystal display (LCD) apparatus, according to one or more exemplary embodiments.

Referring to FIG. 7, the LCD apparatus 2 includes a first (e.g., bottom) substrate 4200 including a first sub-pixel region Sub1, a second sub-pixel region Sub2, and a third sub-pixel region Sub3, a liquid crystal layer 4400 (including liquid crystal molecules 4410) arranged on the bottom substrate 4200, and the color filter substrate 4100 arranged on the liquid crystal layer 4400 to face the bottom substrate 4200. The color filter substrate 4100 includes a top substrate 4110 facing the bottom substrate 4200; an electrode pattern 4120 disposed on a surface of the top substrate 4110, the surface facing the bottom substrate 4200; an alignment layer 4130 disposed on the top substrate 4110 to cover the electrode pattern 4120, and a first light-converter 4141 including a first quantum rod 4141a, a second light-converter 4142 including a second quantum rod 4142a, and a third light-converter 4143 including a third quantum rod 4143a. The first light-converter 4141, the second light-converter 4142, and the third light-converter 4143 are arranged on the alignment layer 4130 in correspondence with the first sub-pixel region Sub1, the second sub-pixel region Sub2, and the third sub-pixel region Sub3, respectively.

The bottom substrate 4200 may include a base substrate 4210 and a switching device SD to drive a plurality of lines including gate lines (not shown), data lines DL, and/or the like, formed on the base substrate 4210 to drive each of the pixels of the liquid crystal display apparatus 2. Although not illustrated, the switching device SD may be arranged in correspondence with each of the first sub-pixel region Sub1, the second sub-pixel region Sub2, and the third sub-pixel region Sub3, and may include at least one thin-film transistor.

An insulating layer 4220 may be disposed over the base substrate 4210 to cover the plurality of lines, such as the data lines DL, and the switching device SD. A first pixel electrode PXL1, a second pixel electrode PXL2, and a third pixel electrode PXL3 that are electrically connected to the switching device SD and are arranged in the first sub-pixel region Sub1, the second sub-pixel region Sub2, and the third sub-pixel region Sub3, respectively, may be arranged on the insulating layer 4220. The first pixel electrode PXL1, the second pixel electrode PXL2, and the third pixel electrode PXL3 may be controlled by the switching device SD, such that voltage may be applied thereto or may not be applied thereto.

According to one or more exemplary embodiments, a polarizer 4500 may be disposed on a surface of the bottom substrate 4200, the surface being opposite another surface of the bottom substrate 4200 that faces the color filter substrate 4100. A backlight unit 4600 for radiating light to the bottom substrate 4200 may be arranged below the polarizer 4500. In one or more exemplary embodiments, the backlight unit 4600 may emit ultraviolet light. The ultraviolet light may include light whose wavelength is equal to or less than about 450 nm. The ultraviolet light emitted from the backlight unit 4600 may be polarized by the polarizer 4500, may pass through the bottom substrate 4200 and the liquid crystal layer 4400, and then may be incident on the color filter substrate 4100.

Hereinafter, the color filter substrate 4100 included in the liquid crystal display apparatus of 2 of FIG. 7 will be described with respect to its differences from the color filter substrate 2100 of FIG. 2.

According to one or more exemplary embodiments, the first sub-pixel region Sub1, the second sub-pixel region Sub2, and the third sub-pixel region Sub3 may be a red sub-pixel region, a green sub-pixel region, and a blue sub-pixel region from which red light, green light, and blue light are emitted, respectively.

A notch filter 4170 may be disposed between the top substrate 4110 and the electrode pattern 4120 in correspondence with the first light-converter 4141, the second light-converter 4142, and the third light-converter 4143. The notch filter 4170 blocks only a particular frequency band component of incident light, and according to one or more exemplary embodiments, the notch filter 2170 may block ultraviolet light. The notch filter 4170 may be disposed in the first sub-pixel region Sub1, the second sub-pixel region Sub2, and the third sub-pixel region Sub3, and, as such, the notch filter 4170 may block ultraviolet light that is changelessly transmitted without being converted by the first light-converter 4141, the second light-converter 4142, and the third light-converter 4143.

The electrode pattern 4120 and the alignment layer 4130 are arranged on the notch filter 4170, and the first light-converter 4141, the second light-converter 4142, and the third light-converter 4143 may be arranged on the alignment layer 4130. A partition wall 4150 is disposed between the first light-converter 4141 and the second light-converter 4142 and is disposed between the second light-converter 4142 and the third light-converter 4143. A planarization layer 4160 may be arranged on the first, second, and third light-converters 4141, 4142, and 4143, as well as on the partition walls 4150. The partition walls 4150 may be formed of a light-absorbing material, and may be disposed to overlap the data lines DL included in the bottom substrate 4200.

According to one or more exemplary embodiments, the first light-converter 4141 may include a first quantum rod 4141a, a liquid crystal 4141b, and a polymer compound 4141c, the second light-converter 4142 may include a second quantum rod 4142a, a liquid crystal 4142b, and a polymer compound 4142c, and a third light-converter 4143 may include a third quantum rod 4143a, a liquid crystal 4143b, and a polymer compound 4143c.

Lengths of short axes and/or long axes of the first quantum rod 4141a, the second quantum rod 4142a, and the third quantum rod 4143a may be different from each other. In one or more exemplary embodiments, the length of the long axis of the first quantum rod 4141a may be longest, and the length of the long axis of the third quantum rod 4143a may be shortest. The first quantum rod 4141a may convert incident ultraviolet light into red light, the second quantum rod 4142a may convert incident ultraviolet light into green light, and the third quantum rod 4143a may convert incident ultraviolet light into blue light.

Long axes of the liquid crystals 4141b, 4142b, and 4143b, the first quantum rod 4141a, the second quantum rod 4142a, and the third quantum rod 4143a may be aligned in a determined direction, and a component of light that is incident on the first light-converter 4141, the second light-converter 4142, and the third light-converter 4143 may pass through the first, second, and third light-converters 4141, 4142, and 4143. The component corresponds to the alignment direction. That is, the first, second, and third light-converters 4141, 4142, and 4143 may function as polarizers.

According to one or more exemplary embodiments, a common electrode 4300 may be disposed on a surface of the color filter substrate 4100, the surface facing the bottom substrate 4200. The common electrode 4300 is disposed on an entire (or substantially entire) surface of the planarization layer 4160. Common voltage may be applied to the common electrode 4300, and the common electrode 4300 and first, second, and third pixel electrodes PXL1, PXL2, and PXL3 may apply an electric field to the liquid crystal layer 4400.

Although not illustrated, an alignment layer (not shown) may be further disposed on and below the liquid crystal layer 4400 to determine an alignment direction of liquid crystals 4410 when an electric field is not applied.

According to one or more exemplary embodiments, the color filter substrates 1100, 2100, 3100, and 4100 may include quantum rods aligned in a determined direction, may simultaneously perform a function of a color filter and a function of a polarizer, and may be included in the liquid crystal display apparatuses 1 and 2. In this manner, it is not required to dispose a separate polarizing plate in (or on) the color filter substrates 1100, 2100, 3100, and 4100. As such, costs of manufacturing the liquid crystal display apparatuses 1 and 2 may be reduced, and a relatively wide viewing angle may be implemented. In addition, since light is not absorbed by a polarizing plate, a luminescent efficiency may be improved. According to one or more exemplary embodiments, in the liquid crystal display apparatuses 1 and 2, a function of a color filter is performed using quantum rods and notch filters that convert a wavelength of incident light and emit light having a narrow half-width. As such, a color reproduction rate of the liquid crystal display apparatuses 1 and 2 may be improved.

Although certain exemplary embodiments and implementations have been described herein, other embodiments and modifications will be apparent from this description.

Accordingly, the inventive concept is not limited to such embodiments, but rather to the broader scope of the presented claims and various obvious modifications and equivalent arrangements.

What is claimed is:

1. A liquid crystal display apparatus comprising:
a first substrate;
a color filter substrate disposed over the first substrate, the first substrate and the color filter substrate comprising a first sub-pixel region, a second sub-pixel region, and a third sub-pixel region; and
a liquid crystal layer disposed between the first substrate and the color filter substrate;
wherein the color filter substrate comprises:
a second substrate facing the first substrate;
an electrode pattern disposed over a surface of the second substrate, the surface facing the first substrate;
a first light-converter disposed in association with the first sub-pixel region, the first light-converter comprising a first quantum rod;
a second light-converter disposed in association with the second sub-pixel region, the second light-converter comprising a second quantum rod;
a third light-converter disposed in association with the third sub-pixel region; and
a first partition wall disposed between the first light-converter and the second light converter, the electrode pattern overlapping an uppermost surface of the first partition wall in a direction perpendicular to the surface of the second substrate, the uppermost surface of the first partition wall being disposed closest to the second substrate among surfaces of the first partition wall.

2. The liquid crystal display apparatus of claim 1, wherein the color filter substrate further comprises:
an alignment layer disposed over the second substrate, the alignment layer covering a portion of the electrode pattern;
a second partition wall disposed between the second light-converter and the third light-converter, the electrode pattern overlapping an uppermost surface of the second partition wall in the direction perpendicular to the surface of the second substrate, the uppermost surface of the second partition wall being disposed closest to the second substrate among surfaces of the second partition wall; and
a planarization layer covering the first light-converter, the second light-converter, the third light-converter, the first partition wall, and the second partition wall.

3. The liquid crystal display apparatus of claim 2, wherein the alignment layer comprises:
a first alignment pattern disposed in association with the first sub-pixel region;
a second alignment pattern disposed in association with the second sub-pixel region, the second alignment pattern being spaced apart from the first alignment pattern by the first partition wall; and
a third alignment pattern disposed in association with the third sub-pixel region, the third alignment pattern being spaced apart from the second alignment pattern by the second partition wall.

4. The liquid crystal display apparatus of claim 1, wherein:
lengths of long axes of the first quantum rod and the second quantum rod are different from one another; and
the long axes of the first quantum rod and the second quantum rod are aligned in a first direction.

5. The liquid crystal display apparatus of claim 4, wherein:
each of the first light-converter, the second light-converter, and the third light-converter comprise liquid crystals and a polymer compound;
the liquid crystals are aligned in substantially the first direction; and
the polymer compound is configured to maintain alignment of the liquid crystals in substantially the first direction.

6. The liquid crystal display apparatus of claim 4, further comprising:
a polarizer disposed over a first surface of the bottom substrate, the first surface being opposite a second surface of the bottom substrate that faces the color filter substrate,
wherein a polarizing axis of the polarizer is substantially perpendicular to the first direction.

7. The liquid crystal display apparatus of claim 1, wherein the first sub-pixel region, the second sub-pixel region, and the third sub-pixel region are respectively a red sub-pixel region, a green sub-pixel region, and a blue sub-pixel region configured to respectively emit red light, green light, and blue light.

8. The liquid crystal display apparatus of claim 7, further comprising:
a backlight configured to radiate blue light towards the bottom substrate,
wherein the third light-converter comprises aligned anisotropic materials.

9. The liquid crystal display apparatus of claim 7, further comprising:
a backlight configured to radiate ultraviolet light towards the bottom substrate,
wherein the third light-converter comprises a third quantum rod, and
wherein a length of a long axis of the third quantum rod is different from lengths of long axes of the first quantum rod and the second quantum rod.

10. The liquid crystal display apparatus of claim 1, further comprising:
a notch filter disposed between the second substrate and the electrode pattern such that the notch filter overlaps the first partition wall in the direction perpendicular to the surface of the second substrate, the notch filter overlapping the first light-converter and the second light-converter in the direction perpendicular to the surface of the second substrate.

11. The liquid crystal display apparatus of claim 10 wherein:
the notch filter is configured to block blue light; and
the notch filter is disposed outside a region overlapping the third light-converter.

12. The liquid crystal display apparatus of claim 10, wherein:
the notch filter is configured to block ultraviolet light; and
the notch filter overlaps the first light-converter, the second light-converter, and the third light-converter in the direction perpendicular to the surface of the second substrate.

13. The liquid crystal display apparatus of claim 1, further comprising:
a common electrode disposed between the color filter substrate and the liquid crystal layer.

* * * * *